(12) United States Patent
Gao et al.

(10) Patent No.: US 11,749,262 B2
(45) Date of Patent: Sep. 5, 2023

(54) KEYWORD DETECTION METHOD AND RELATED APPARATUS

(71) Applicant: TENCENT TECHNOLOGY (SHENZHEN) COMPANY LIMITED, Shenzhen (CN)

(72) Inventors: Yi Gao, Shenzhen (CN); Ian Ernan Liu, Shenzhen (CN); Min Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 216 days.

(21) Appl. No.: 17/343,746

(22) Filed: Jun. 10, 2021

(65) Prior Publication Data

US 2021/0304735 A1 Sep. 30, 2021

Related U.S. Application Data

(63) Continuation of application No. PCT/CN2020/070835, filed on Jan. 8, 2020.

(30) Foreign Application Priority Data

Jan. 10, 2019 (CN) .......................... 201910023586.6

(51) Int. Cl.
*G10L 15/08* (2006.01)
*G10L 21/0208* (2013.01)
(Continued)

(52) U.S. Cl.
CPC .............. *G10L 15/08* (2013.01); *G10L 15/22* (2013.01); *G10L 21/0208* (2013.01);
(Continued)

(58) Field of Classification Search
CPC ..... G10L 15/22; G10L 21/02; G10L 21/0208; G10L 2021/02082; G10L 2015/088; G10L 15/08; G10L 21/043; G10L 21/04
See application file for complete search history.

(56) References Cited

U.S. PATENT DOCUMENTS

| 10,460,722 B1* | 10/2019 | Sun | .......................... G06N 3/08 |
| 2002/0013695 A1* | 1/2002 | Belt | ........................ H04R 3/00 704/205 |

(Continued)

FOREIGN PATENT DOCUMENTS

| CN | 1490787 A | 4/2004 |
| CN | 1512485 A | 7/2004 |

(Continued)

OTHER PUBLICATIONS

The World Intellectual Property Organization (WIPO) International Search Report for PCT/CN2020/070835 dated Apr. 9, 2020 6 Pages (including translation).

(Continued)

*Primary Examiner* — Samuel G Neway
(74) *Attorney, Agent, or Firm* — ANOVA LAW GROUP, PLLC

(57) ABSTRACT

A keyword detection method includes: obtaining an enhanced speech signal of a to-be-detected speech signal, the enhanced speech signal corresponding to a target speech speed; performing speed adjustment on the enhanced speech signal to obtain a first speed-adjusted speech signal having a first speech speed, the first speech speed being different from the target speech speed; obtaining a first speech feature signal according to the first speed-adjusted speech signal; obtaining a detection result according to a first keyword detection result corresponding to the first speech feature signal, the detection result indicating whether a target keyword exists in the to-be-detected speech signal; and per- (Continued)

forming an operation corresponding to the target keyword in response to determining that the target keyword exists according to the detection result.

20 Claims, 10 Drawing Sheets

(51) Int. Cl.
  *G10L 21/043* (2013.01)
  *G10L 15/22* (2006.01)
(52) U.S. Cl.
  CPC ...... *G10L 21/043* (2013.01); *G10L 2015/088* (2013.01); *G10L 2021/02082* (2013.01)

(56) References Cited

U.S. PATENT DOCUMENTS

| | | | |
|---|---|---|---|
| 2004/0078195 A1* | 4/2004 | Oda | G10L 21/003 |
| | | | 704/E15.009 |
| 2007/0168188 A1 | 7/2007 | Choi | |
| 2011/0026730 A1* | 2/2011 | Li | H04R 3/005 |
| | | | 381/92 |
| 2013/0121498 A1* | 5/2013 | Giesbrecht | H04M 9/082 |
| | | | 381/92 |
| 2014/0337021 A1* | 11/2014 | Kim | G10L 25/81 |
| | | | 704/228 |
| 2015/0154979 A1 | 6/2015 | Uemura et al. | |
| 2016/0275961 A1* | 9/2016 | Yu | H04M 9/082 |
| 2018/0166071 A1* | 6/2018 | Lee | G10L 15/07 |
| 2018/0182392 A1 | 6/2018 | Li et al. | |
| 2018/0247642 A1* | 8/2018 | Kim | G10L 15/16 |
| 2018/0336892 A1* | 11/2018 | Kim | H04R 3/00 |
| 2018/0350379 A1* | 12/2018 | Wung | G10L 21/038 |
| 2019/0043491 A1* | 2/2019 | Kupryjanow | G10L 21/0208 |
| 2021/0304735 A1* | 9/2021 | Gao | H04R 3/005 |

FOREIGN PATENT DOCUMENTS

| | | |
|---|---|---|
| CN | 102855884 A | 1/2013 |
| CN | 103472990 A | 12/2013 |
| CN | 106128477 A | 11/2016 |
| CN | 106910500 A | 6/2017 |
| CN | 108682429 A | 10/2018 |
| CN | 109671433 A | 4/2019 |
| KR | 20130037910 A | 4/2013 |
| TW | I362017 B | 4/2012 |

OTHER PUBLICATIONS

Taiwan Intellectual Property Office Examination report for Application No. 109100644 dated Oct. 21, 2020 12 pages (including translation).
W. Verhelst et al., "An Overlap-Add Technique Based on Waveform Similarity (WSOLA) for High Quality Time-Scale Modification of Speech," 1993 IEEE International Conference on Acoustics, Speech, and Signal Processing, Apr. 1993. 4 pages.
The European Patent Office (EPO) The Partial Supplementary European Search Report for 20738838.0 dated Feb. 16, 2022 12 Pages.
The European Patent Office (EPO) The Extended European Search Report for 20738838.0 dated May 17, 2022 11 Pages.

* cited by examiner

KEYWORD DETECTION METHOD AND RELATED APPARATUS

CROSS-REFERENCES TO RELATED APPLICATIONS

This application is a continuation application of PCT Patent Application No. PCT/CN2020/070835, entitled "KEYWORD DETECTION METHOD AND RELATED APPARATUS" and filed on Jan. 8, 2020, which claims priority to Chinese Patent Application No. 201910023586.6, entitled "KEYWORD DETECTION METHOD AND RELATED APPARATUS", filed on Jan. 10, 2019, all which are incorporated herein by reference in their entireties.

FIELD OF THE TECHNOLOGY

The present disclosure relates to the technical field of audio processing, and in particular, to a keyword detection method and related apparatus.

BACKGROUND OF THE DISCLOSURE

With the popularization of smart speech devices, man-machine interaction with smart devices through speech commands has become an important function. In speech interaction applications, based on the consideration of product power consumption, interaction experience, and privacy, users need to awaken smart devices through speech keywords to conduct the next step of man-machine speech interaction.

At present, for a smart speech device, at least one keyword needs to be predetermined. When the user awakens the smart speech device, the corresponding keyword is to be read out at a normal speed. Under normal conditions, for a four-word keyword, it takes about 0.5 seconds to read out at a normal speed.

However, in many cases, it is difficult to ensure that the user reads out the keyword at a constant speed. In one example, it takes a user only 0.2 seconds to read out a four-word keyword, or in another example, it takes a user nearly 1.5 seconds to read out a four-word keyword. In these scenarios, the smart speech device is often difficult to detect whether the current speech contains keywords, resulting in a low keyword detection rate.

SUMMARY

Embodiments of the present disclosure provide a keyword detection method and related apparatus, which may enhance a speech signal to effectively improve the speech recognition quality, and further to perform speed adjustment on the enhanced signal, and therefore, the detection rate of keywords in fast speech or slow speech is improved.

Therefore, in a first aspect of the present disclosure, a keyword detection method is provided, including: obtaining an enhanced speech signal of a to-be-detected speech signal, the enhanced speech signal corresponding to a target speech speed; performing speed adjustment on the enhanced speech signal to obtain a first speed-adjusted speech signal having a first speech speed, the first speech speed being different from the target speech speed; obtaining a first speech feature signal according to the first speed-adjusted speech signal; obtaining a detection result according to a first keyword detection result corresponding to the first speech feature signal, the detection result indicating whether a target keyword exists in the to-be-detected speech signal; and performing an operation corresponding to the target keyword in response to determining that the target keyword exists according to the detection result.

According to another aspect of the present disclosure, a keyword detection apparatus provided, including: an obtaining module, configured to obtain an enhanced speech signal of a to-be-detected speech signal, the enhanced speech signal corresponding to a target speech speed; a speed-adjusted module, configured to perform speed adjustment on the enhanced speech signal obtained by the obtaining module to obtain a first speed-adjusted speech signal having a first speech speed, the first speech speed being different from the target speech speed, the obtaining module being further configured to obtain a first speech feature signal according to the first speed-adjusted speech signal obtained after the speed-adjusted module performs the speed adjustment, the obtaining module being further configured to obtain a detection result according to a first keyword detection result corresponding to the first speech feature signal, the detection result indicating whether a target keyword exists in the to-be-detected speech signal; and an execution module configured to perform an operation corresponding to the target keyword in response to determining that the target keyword exists according to the detection result obtained by the obtaining module.

According to another aspect of the present disclosure, a computer device is provided, the computer device being configured to perform the foregoing keyword detection method. Specifically, the device may include modules configured to perform the foregoing keyword detection method. The computer device includes a memory configured to store a program and a processor configured to execute the program in the memory, to perform a plurality of operations. The operations include: obtaining an enhanced speech signal of a to-be-detected speech signal, the enhanced speech signal corresponding to a target speech speed; performing speed adjustment on the enhanced speech signal to obtain a first speed-adjusted speech signal having a first speech speed, the first speech speed being different from the target speech speed; obtaining a first speech feature signal according to the first speed-adjusted speech signal; obtaining a detection result according to a first keyword detection result corresponding to the first speech feature signal, the detection result indicating whether a target keyword exists in the to-be-detected speech signal; and performing an operation corresponding to the target keyword in response to determining that the target keyword exists according to the detection result.

According to a fourth aspect of the present disclosure, a non-transitory computer-readable storage medium is provided, the transitory computer-readable storage medium storing instructions, the instructions, when run on a computer, causing the computer to perform a plurality of operations according to any one of the foregoing aspects. The operations include: obtaining an enhanced speech signal of a to-be-detected speech signal, the enhanced speech signal corresponding to a target speech speed; performing speed adjustment on the enhanced speech signal to obtain a first speed-adjusted speech signal having a first speech speed, the first speech speed being different from the target speech speed; obtaining a first speech feature signal according to the first speed-adjusted speech signal; obtaining a detection result according to a first keyword detection result corresponding to the first speech feature signal, the detection result indicating whether a target keyword exists in the to-be-detected speech signal; and performing an operation corresponding to the target keyword in response to determining that the target keyword exists according to the detection result.

It can be seen from the foregoing technical solutions that the embodiments of the present disclosure correspond to the following advantages.

In an embodiment of the present disclosure, a keyword detection method is provided. The keyword detection apparatus obtains an enhanced speech signal of a to-be-detected speech signal, the enhanced speech signal being corresponding to a target speech speed, then the keyword detection apparatus performs speed adjustment on the enhanced speech signal to obtain a first speed-adjusted speech signal, the first speed-adjusted speech signal being corresponding to a first speech speed, the first speech speed being different from the target speech speed; and obtains a first speech feature signal according to the first speed-adjusted speech signal; and finally, the keyword detection apparatus obtains a first keyword detection result corresponding to the first speech feature signal, the keyword detection result indicating whether a target keyword exists in the to-be-detected speech signal; and performs an operation corresponding to the target keyword in response to determining that the target keyword exists according to the keyword detection result. Through the foregoing manner, signal enhancement processing and speed adjustment need to be performed on a to-be-detected speech signal before detecting a keyword. Enhancing a speech signal may effectively improve the speech recognition quality, and further to perform the speed adjustment on the enhanced signal, and therefore, the detection rate of keywords in fast speech or slow speech is improved.

DESCRIPTION OF EMBODIMENTS

Figure 1:
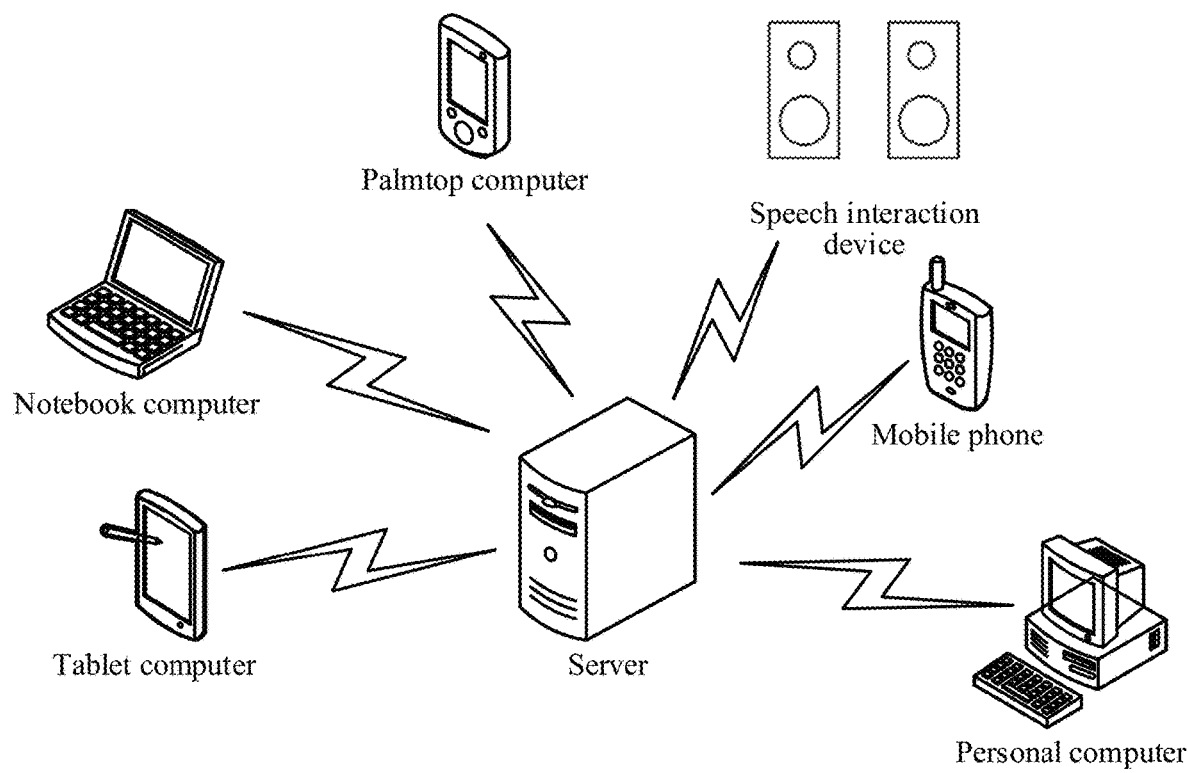
FIG. 1 is a schematic architectural diagram of a keyword detection system according to an embodiment of the present disclosure.

Embodiments of the present disclosure provide a keyword detection method and related apparatus, which may enhance a speech signal to effectively improve the speech recognition quality, and further to perform speed adjustment on the enhanced signal, and therefore, the detection rate of keywords in fast speech or slow speech is improved.

The terms "first", "second", "third", "fourth", and the like (if any) in the specification and the claims of the present disclosure and the foregoing accompanying drawings are used for distinguishing similar objects, and are not necessarily used for describing a particular sequence or order. It may be understood that the data termed in such a way is interchangeable in proper circumstances, so that the embodiments of the present disclosure described herein for example, can be implemented in other orders than the order illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Embodiments of the present disclosure are illustrated in a man-machine interaction scenario, and specifically, to a speech interaction scenario. The speech interaction creates a new set of accompanying scenarios, for example, after getting up in the morning, we can listen to the radio while washing, we can also listen to music while running at night. The speech interaction liberates people's hands and eyes, and through the speech interaction, we can "do two things at one time". This greatly improves our efficiency in certain scenarios, and the speech interaction aims at a scenario in which human hands and eyes are inconveniently used. In addition, with the expansion of the influence of smart devices, the user group is gradually and significantly spreading to the elderly, the younger age group and the physically handicapped group. However, for these new users, the original touch control interaction manner may not be appropriate, and the user habit is not formed. For example, older people have poor vision and poor finger flexibility; young children are not able to master skills such as handwriting and are not suitable to look at the electronic screen for long time; and visually impaired or blind people are more likely to receive voice information and give voice commands. Therefore, the speech interaction is more suitable for expanding new user groups of smart devices.

The speech interaction also has a plurality of advantages, for example, high interaction speed (setting an alarm clock through a graphic interaction interface may need 3 minutes, but may only need 30 seconds through the speech interaction), simple operation (two hands are released, and there is no need to tediously open an application, you only need to find a song first and click to play, and then say "play music" or "play the next song" while reading a book); personalized customization (you can understand the problem according to the previous background), and relatively low cost (microphone, speaker, processor, and the like are required, but these devices are relatively cheap and provide a prerequisite for awakening everything).

The speech interaction scenario includes, but is not limited to, at home (for example, control the home appliances through speech), in the car (the speech interaction also has absolute advantages over the unsafe operation of mobile phones), and on the road (after getting used to watching your mobile phone while walking, you can play music or check an email through speech control while walking).

Smart devices based on speech interaction have been practical, and have been widely used in devices such as household appliances, cars, and mobile phones. A plurality of devices have voice wake-up functions for screen unlocking or as an auxiliary means to start applications. The voice wake-up function is a technology that, when a device is in a stand-by state in a very low power consumption condition, an apparatus is executed in the background in a continuous manner, and a predefined keyword is detected, when it is detected that a user has said the word, the device is waken up, so as to enable the device to be in a normal operation state.

For ease of understanding, the present disclosure provides a keyword detection method. The method is applied to the keyword detection system shown in FIG. 1. FIG. 1 is a schematic architectural diagram of a keyword detection system according to an embodiment of the present disclosure. As shown in the figure, a user enters a speech through a microphone, and the keyword detection apparatus converts the speech into a to-be-detected speech signal, then enhances the to-be-detected speech signal to obtain an enhanced speech signal, the enhanced speech signal being corresponding to an original speech speed. Then, the keyword detection apparatus performs speed adjustment on the enhanced speech signal to obtain a first speed-adjusted speech signal. In a general case, if the original speech speed is too fast, the original speech speed may be lowered through the speed adjustment. Otherwise, if the original speech speed is too slow, the original speech speed may be accelerated through the speed adjustment. The keyword detection apparatus extracts a speech feature signal from the speech signal after the speed adjustment, and then obtains a keyword detection result corresponding to the speech feature signal, for example, inputs the speech feature signal into a trained keyword detection model, so that the keyword detection model outputs a corresponding keyword detection result, so as to determine whether a target keyword is included in the speech said by the user. It is to be understood that the keyword detection apparatus may be deployed on a smart device, or may be deployed on a server. If the keyword detection apparatus is deployed on a smart device, the smart device may detect whether a target keyword is included in a speech in an off-line state. If the keyword detection apparatus is deployed on a server, after collecting a speech of a user, a smart device transmits the speech to a server synchronously or asynchronously in an on-line state, so that the server detects whether a target keyword is included in the speech.

A client is deployed on a smart device. The smart device includes, but is not limited to, a tablet computer, a notebook computer, a palmtop computer, a mobile phone, a speech interaction device, and a personal computer (PC), and is not limited herein. The speech interaction device includes, but is not limited to a smart sound and a smart home appliance. The speech interaction device further has the following features:

1. Networking function. Each speech interaction device may be connected together through a local area network, or may be connected to a service station of a manufacturer through a home gateway interface, and finally to be connected to the Internet to share information.

2. Intellectualization. The speech interaction device may make different responses according to different surroundings without human intervention.

3. Openness and compatibility. Because the speech interaction devices of users may come from different manufacturers, the speech interaction devices need to have the openness and compatibility.

4. Energy conservation. The smart home appliances may automatically adjust working time and working state according to surroundings, so as to save energy.

5. Accessibility. Because complex control operation procedure has been resolved by a controller embedded in the speech interaction device, a user only needs to learn very simple operations. The speech interaction device does not only mean a device, but a technology system. With continuous development of human application requirements and speech interaction devices intellectualization, the content will be richer, and functions of the speech interaction device may also be different according to different actual application environments, but smart control technology is to be provided.

Figure 2:
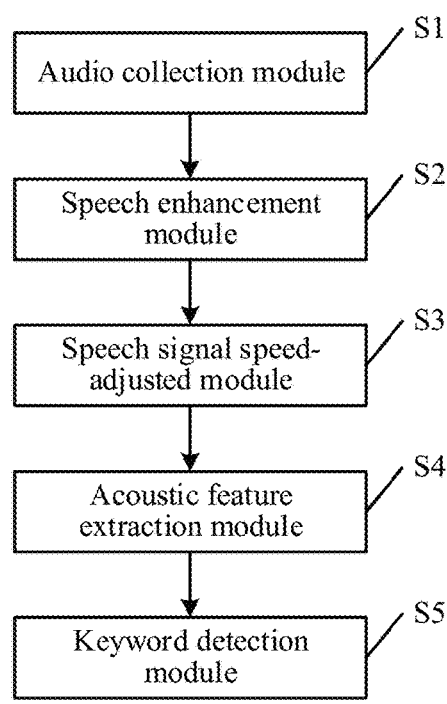
FIG. 2 is a schematic flowchart of a keyword detection according to an embodiment of the present disclosure.

It is to be understood that the detection procedure of a keyword is described with reference to FIG. 2 in the present disclosure. FIG. 2 is a schematic flowchart of a keyword detection according to an embodiment of the present disclosure. As shown in the figure, the process is specifically as follows. An audio collection module S1 is an audio collection front end composed of a microphone, an analog-digital converter, and the like. The audio collection module S1 may be a single microphone, or may be a microphone array composed of a plurality of microphones. The audio collection module S1 collects a voice signal and transmits the voice signal to a speech enhancement module S2. The speech enhancement module S2 receives a microphone digital signal, and enhances a target speech signal through algorithms such as echo cancellation, beamforming, noise suppression, and reverberation cancellation, to form an enhanced speech signal, and transmits the enhanced speech signal to a speech signal speed-adjusted module S3. The speech signal speed-adjusted module S3 performs speed adjustment on the speech to obtain a speed-adjusted speech signal. An acoustic feature extraction module S4 performs feature extraction on the received speed-adjusted speech signal. A keyword detection module S5 determines whether a target keyword is included in a speech by detecting an inputted speech feature signal in real time.

Figure 3:
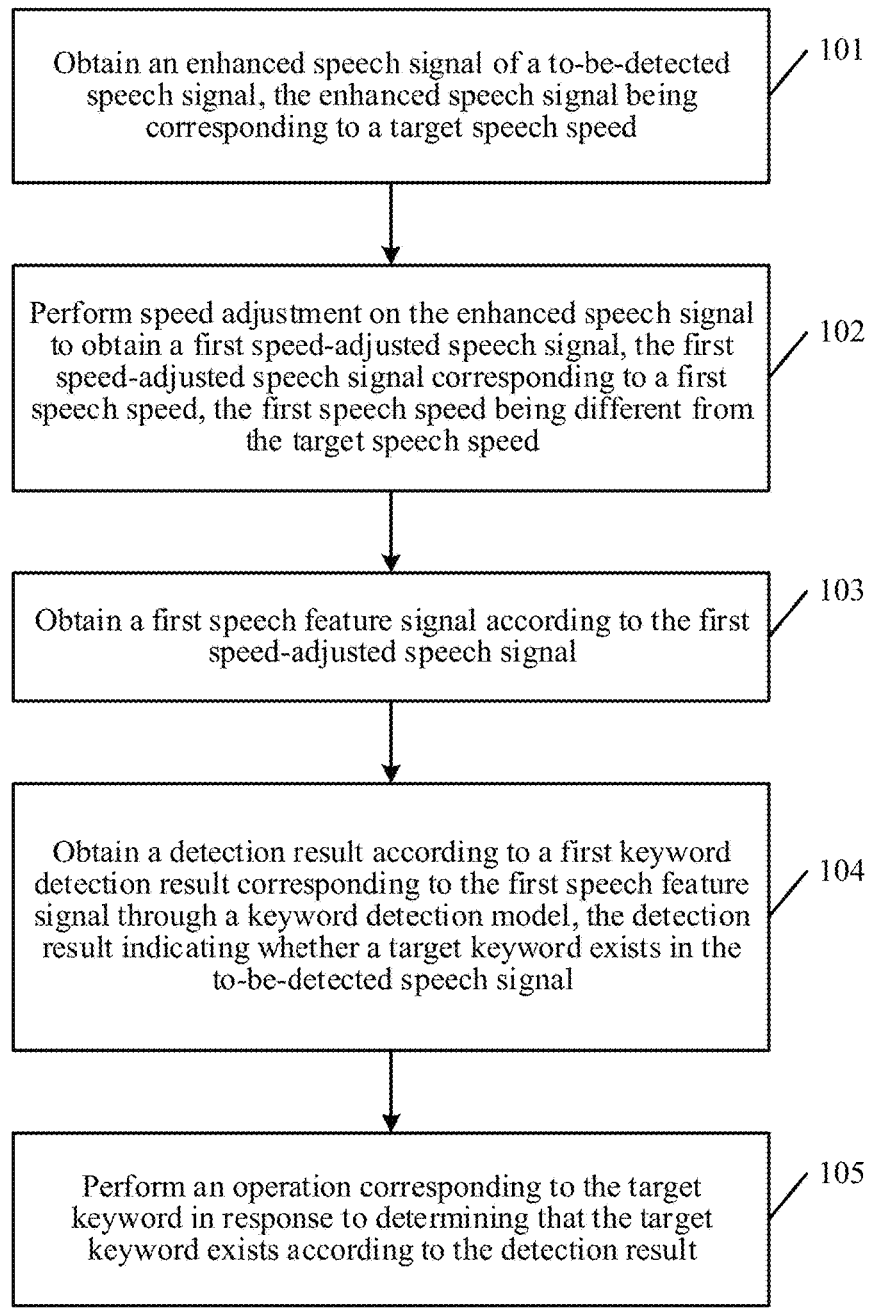
FIG. 3 is a schematic diagram of an embodiment of a keyword detection method according to an embodiment of the present disclosure.

With reference to the foregoing description, the keyword detection method in the present disclosure is described below. An execution body of each operation of the detection method may be a computer device. The computer device is an electronic device having data calculating and storage capability, such as the smart device or server described above. The computer device may include a keyword detection apparatus for performing method operations described below. Referring to FIG. 3, an embodiment of the keyword detection method in one embodiment of the present disclosure includes the following operations:

101. Obtain an enhanced speech signal of a to-be-detected speech signal, the enhanced speech signal being corresponding to a target speech speed.

In one embodiment, a user speaks a speech through an input apparatus (for example, a microphone), and a keyword detection apparatus processes the speech to obtain a to-be-detected speech signal, then performs speech enhancement processing on the to-be-detected speech signal to obtain an enhanced speech signal, the enhanced speech signal being corresponding to a target speech speed.

Speech speed is a uniquely linguistic expression definition peculiar to human beings. When people use words having the meaning of propagation or communication to express or transmit information, the speech speed is the vocabulary capacity included in a unit time. An audio type in the present disclosure may be Chinese, English, Japanese, German, French, or the like. The audio type is not limited herein.

102. Perform speed adjustment on the enhanced speech signal to obtain a first speed-adjusted speech signal, the first speed-adjusted speech signal being corresponding to a first speech speed, the first speech speed being different from the target speech speed.

In one embodiment, the keyword detection apparatus performs speed adjustment on the enhanced speech signal to obtain a first speed-adjusted speech signal, the first speed-adjusted speech signal being corresponding to a first speech speed. The first speech speed may be faster than the target speech speed, alternatively, the first speech speed may be slower than the target speech speed. In one embodiment, the first speech speed is a specific predefined value, alternatively, the first speech speed belongs to a specific defined value range. When a speech speed of a speech signal satisfies the predefined value or value range, it indicates that the speech speed of the speech signal is moderate, not too fast or too slow, and is suitable for keyword detection. Therefore, the detection rate of a keyword is improved.

103. Obtain a first speech feature signal according to the first speed-adjusted speech signal.

In one embodiment, the keyword detection apparatus extracts the first speech feature signal from the first speed-adjusted speech signal. Specifically, the speech signal is a common time sequence, which is encoded in a manner of discrete signals, and then is stored in a specific file format. In applications related to speech, almost all the applications are related to the speech feature extraction, for example, speech context conversion, speaker recognition, and speech emotion recognition. The speech feature extraction is to extract content related to main information from a digital signal, and the extraction is generally performed from two different perspectives: time domain and frequency domain. These features may be classified from different perspectives. Generally, before the feature extraction, a series of preprocessing need to be performed on an original speech signal sequence. Common preprocessing include the following:

1. Channel conversion is to convert a speech signal of a plurality of channels into a single channel speech. The channel conversion is not required if the speech signal is a single channel speech.

2. Pre-emphasis aims to only retain signals in a certain frequency range. Actually, the process acts as a high-pass filter. A first order high-pass filter has a good amplifying effect on high frequency signals, and greatly compresses the amplitude of low frequency signals. Meanwhile, a phase lag effect is further generated, which is especially obvious for high frequency signals.

3. Resample is a process of interpolating another type of pixel information according to a type of pixel information. Actually, speech signals we meet may come from different devices, and set parameters are different when recording these speech signals, and the most important parameter is a sampling rate. According to the Nyquist sampling theorem, a sampling frequency needs to be greater than or equal to twice the maximum frequency component of the signal, to ensure that the signal is recovered by using the sampled data.

4. Framing is to combine related information into a frame. Although a digital speech signal is a random sequence that varies over time, and is not a stationary random process from a global perspective. However, in a relatively short period of time, it may be considered as an approximate stationary random process. A length of the period of time may be regarded as 25 ms to 32 ms. That is, a discrete sequence is divided into groups according to frame lengths of 25 ms to 32 ms, and each group is a frame. In addition, to ensure the continuity of speech signals, there is usually a certain amount of overlap between adjacent frames. The overlapped part is generally ⅓ to ½ of a frame length.

5. Windowing is usually used with the framing. For each frame, a window function is selected, and a width of the window function is a frame length. Common window functions include a rectangular window, a Hamming window, a Hanning window, and a Gaussian window.

In an actual application, procedures of pre-operations may be performed according to the foregoing order, alternatively, the execution order of the operation may be selected according to situations. This is only an example.

104. Obtain a detection result according to a first keyword detection result corresponding to the first speech feature signal through a keyword detection model, the detection result indicating whether a target keyword exists in the to-be-detected speech signal. In some embodiments, the detection result may be also be referred as keyword detection result, and may be obtained according to at least one of the first keyword detection result corresponding to the first speech feature signal (e.g., a feature signal corresponding to a speech speed slower than the target speech speed), a second keyword detection result corresponding to a second speech feature signal (e.g., a feature signal corresponding to the target speech speed), or a third keyword detection result corresponding to a third speech feature signal (e.g., a feature signal corresponding to a speech speed faster than the target speech speed). In some embodiments, when determining the detection result according to keyword detection results corresponding to multiple speech feature signals, the detection result may indicate that the target keyword exists when the target keyword is detected according to any one of the speech feature signals.

In one embodiment, the extracted first speech feature signal is inputted into the keyword detection model, for the keyword detection model to output the keyword detection result. Whether the target keyword exists in the to-be-detected speech signal, that is, whether a target keyword exists in a speech said by a user, may be determined according to the keyword detection result. For example, the target keyword is "xiao teng, wake up", and when it is detected that the target keyword "xiao teng, wake up" exists in a speech, a device is awakened to perform corresponding operations.

Certainly, in some other examples, in addition to the keyword detection model, the first keyword detection result corresponding to the first speech feature signal may alternatively be obtained through other technical means, for example, mode recognition and template matching. This is not limited in the embodiments of the present disclosure.

105. Perform an operation corresponding to the target keyword in response to determining that the target keyword exists according to the keyword detection result.

An operation corresponding to the target keyword is performed in response to determining that the target keyword exists according to the keyword detection result. In one embodiment, if the keyword detection result indicates that the target keyword exists in the to-be-detected speech signal, the corresponding operation may be performed. For example, the target keyword is "turn on the light", the smart device turns on the light accordingly.

In an embodiment of the present disclosure, a keyword detection method is provided. The keyword detection apparatus obtains an enhanced speech signal of a to-be-detected speech signal, the enhanced speech signal being corresponding to a target speech speed, then the keyword detection apparatus performs speed adjustment on the enhanced speech signal to obtain a first speed-adjusted speech signal, the first speed-adjusted speech signal being corresponding to a first speech speed, the first speech speed being different from the target speech speed; and obtains a first speech feature signal according to the first speed-adjusted speech signal; and finally, the keyword detection apparatus obtains a first keyword detection result corresponding to the first speech feature signal, the keyword detection result indicating whether a target keyword exists in the to-be-detected speech signal; and performs an operation corresponding to the target keyword in response to determining that the target keyword exists according to the keyword detection result. Through the foregoing manner, signal enhancement processing and speed adjustment need to be performed on a to-be-detected speech signal before detecting a keyword. Enhancing a speech signal may effectively improve the speech recognition quality, and further to perform the speed adjustment on the enhanced signal, and therefore, the detection rate of keywords in fast speech or slow speech is improved.

In one embodiment, based on the embodiment corresponding to FIG. 3, the obtaining an enhanced speech signal of a to-be-detected speech signal may include:

obtaining a to-be-detected speech signal; and processing the to-be-detected speech signal through a speech enhancement algorithm, to obtain the enhanced speech signal.

In one embodiment, because a speech is affected by noise from the surrounding environment and the introduction of transmission media in a communication process, the received to-be-detected speech signal is not a pure original speech signal, but a noise speech signal polluted by the noise. The "noise" herein is defined as an interference signal in addition to the required to-be-detected speech signal. The interference signal may be a narrow band, wide band, white noise, colored noise, acoustic, electrical, additive or multiplicative speech, or may be another unrelated speech.

The noise may be classified into two categories of additive noise and non-additive noise according to the relationship between the noise and the inputted speech signal. Some non-additive noise may be converted into the additive noise through a certain transformation. The additive noise during speech processing is generally classified into periodic noise, impulse noise, wideband noise, other voice interference in the same channel, and the like. The periodic noise mainly comes from engines and other machinery which run periodically. Electrical interference can also cause periodic noise. A feature of the periodic noise is that there are a plurality of discrete line spectra on a frequency spectrum. Actually, a signal is affected by a plurality of factors, and a line spectrum component is usually converted into a narrow band spectral structure, and generally, these narrowband spectra are time-varying and not fixed in position. These noise component needs to be effectively distinguished by using an adaptive filtering method. The impulse noise comes from explosion, hit, discharging, sudden disturbance, and the like. A feature of the impulse noise is that a width in time is very narrow. A process of canceling the impulse noise in time domain is that: a threshold is determined according to an average value of the amplitudes of the noise speech signal. When a signal exceeds the threshold, the signal is determined as the impulse noise. Then the noise component can be completely canceled by proper attenuation of the signal. Alternatively, an interpolation method can also be used to smooth the impulse noise in the time domain. There are many sources of the wideband noise. thermal noise, airflow noise, all kinds of random noise sources, and quantization noise can be regarded as the wideband noise. The wideband noise and the speech signal are basically overlapped in the time domain and the frequency domain. The noise component exists alone only during the absence of speech. Therefore, the noise is relatively difficult to cancel. Stable wideband noise may generally be regarded as white gaussian noise. The speech interference caused by the simultaneous transmission of an interference speech signal and a to-be-transmitted speech signal in a channel is called the same channel speech interference. A basic method of distinguishing a useful speech from an interference speech is to use their pitch differences. In general, the pitches of the two kinds of speeches are different, and are not integer multiples. In this case, a comb filter may be used to extract pitches and various subharmonics, and then recover useful speech signals. The transmission noise is circuit noise of a transmission system. This type of noise can be treated by the method of homomorphism, which is to transform the non-additive noise into additive noise.

For the noise in the to-be-detected speech signal, the following types of speech enhancement algorithms may be adopted to process the to-be-detected speech signal, to obtain the enhanced speech signal. It is to be understood that, adopting the speech enhancement algorithm may improve the anti-noise capability of the preprocessing and the signal-to-noise ratio (SNR) of the inputted signal.

The first algorithm is a speech enhancement algorithm based on spectral subtraction. The spectral subtraction is a speech enhancement method provided based on the statistical stability of the noise and the uncorrelation between the additive noise and the speech. The speech enhancement method places an estimated object on the short-time spectral amplitude.

The second algorithm is a speech enhancement algorithm of an adaptive filtering method. The parameters can be adjusted when using that the statistical characteristics of the adaptive filtering method in an input process are unknown or the statistical characteristics in the input process are changed, to meet the requirements of a specific optimum criterion.

The third algorithm is a speech enhancement algorithm based on statistics. The statistics method makes full use of the statistical characteristics of speech and noise, and generally a model base is established. It is necessary to obtain initial statistical parameters in the training process, which is closely related to the keyword detection system. For example, the speech enhancement algorithm for a minimum mean squared error (MMSE) of a number spectrum in a short time can achieve a compromise between speech intelligibility and articulation by using an auditory masking effect, and it is applicable to a wide range of SNR.

The fourth algorithm is a speech enhancement algorithm of another type, for example, a wavelet transform algorithm, a Karhunen-Loéve transform (KLT) algorithm, a discrete cosine transform (DCT), and an artificial neural network algorithm.

In addition, in the embodiments of the present disclosure, a method of obtaining enhanced speech information is provided. That is, a keyword detection apparatus obtains a to-be-detected speech signal, and then the keyword detection apparatus processes the to-be-detected speech signal through a speech enhancement algorithm, to obtain an enhanced speech signal. Through the foregoing manners, the speech enhancement can be implemented by using the speech enhancement algorithm. The speech enhancement refers to the extraction of useful speech signals from the noise background and the suppression and reduction of noise interference when a to-be-detected speech signal is interfered or even drowned by various kinds of noise. Thus, an original speech as pure as possible can be extracted from the to-be-detected speech signal, so as to improve the accuracy of detecting a target keyword. Therefore, using the speech enhancement technology to preprocess the to-be-detected speech signal can effectively improve the system performance, and improve the recognition rate and anti-interference capability of the system.

In one embodiment, based on the embodiment corresponding to FIG. 3, if the to-be-detected speech signal is a speech signal received through a single speech input device, the foregoing operation of processing the to-be-detected speech signal through a speech enhancement algorithm, to obtain an enhanced speech signal may include:

processing the to-be-detected speech signal through at least one of an echo cancellation algorithm, a noise cancellation algorithm, and a reverberation cancellation algorithm, to obtain the enhanced speech signal, the echo cancellation algorithm being used for canceling an echo signal in the to-be-detected speech signal, the noise cancellation algorithm being used for suppressing stationary noise and/or non-stationary noise in the to-be-detected speech signal, and the reverberation cancellation algorithm being used for canceling a reverberation in the to-be-detected speech signal.

the keyword detection apparatus may receive a to-be-detected speech signal through a single speech input device. Alternatively, another device may receive a to-be-detected speech signal through a single speech input device, and then the another device transmits the to-be-detected speech signal to the keyword detection apparatus for a subsequent keyword detection.

Figure 4:
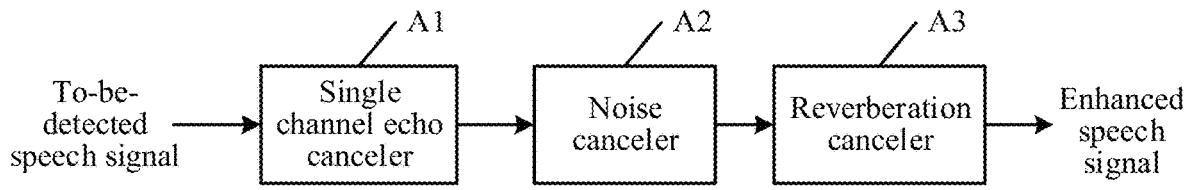
FIG. 4 is a schematic diagram of an embodiment of performing speech enhancement on a signal of a single microphone according to an embodiment of the present disclosure.

In one embodiment, based on that the audio collection module S1 and the speech enhancement module S2 shown in FIG. 2 generally have a relatively strong coupling relationship, for example, for an audio collection system of a single microphone, generally different speech enhancement modules S2 are required to achieve an optimal speech enhancement effect. When a single microphone system is adopted, an embodiment of the speech enhancement module is shown as FIG. 4. FIG. 4 is a schematic diagram of an embodiment of performing speech enhancement on a signal of a single microphone according to an embodiment of the present disclosure. As shown in the figure, a to-be-detected speech signal received by a single speech input device is inputted into a single channel echo canceler A1, and the single speech input device may be specifically a single microphone.

The single channel echo canceler A1 performs cancellation processing on an echo signal in the to-be-detected speech signal by using an echo cancellation algorithm, specifically, the echo cancellation algorithm includes, but is not limited to a recursive least square (RLS) and a least mean square (LMS). The single channel echo canceler A1 adopts an RLS adaptive filter or an LMS adaptive filter to perform adaptive tracking and filtering on the echo signal received by the single microphone, in order to reduce the interference of the sound played by itself to the voice of the received target keyword as much as possible.

A noise canceler A2 suppresses stationary noise by using algorithms including wiener filtering, spectral subtraction, and the like, or suppresses steady or non-stationary noise by using a neural network speech enhancement algorithm, to reduce the interference of the environment noise to the target keyword speech. The wiener filtering is an optimal estimator for stationary processes based on the minimum mean square error criterion. A mean square error between an output of the filter and an expected output of the filter is minimum, and therefore, the filter is an optimal filtering system, which may be used to extract a signal polluted by stationary noise. The process of filtering out noise and interference from continuous (or discrete) inputted data to extract useful information is called filtering. This is one of the main methods often used in signal processing, which has a very important application value, and a corresponding apparatus is called a filter. The filter may be divided into a linear filter and a non-linear filter according to whether the output of the filter is an inputted linear function. The wiener filtering is a linear filter.

A reverberation canceler A3 may estimate based on a room impulse response of a cepstrum domain, and then carry out adaptive inverse filtering to de-reverb. Most reverberation cancellation algorithms are based on short-time analysis, which inevitably brings a truncation effect. If a reverberation speech is inverted filtered, the room impulse response is required to satisfy the minimum phase. According to the principle of signal minimum phase decomposition, the received speech signal with noise and reverberation is decomposed into a minimum phase part and an all-pass part. The minimum phase part is filtered in complex cepstrum domain, and then combined with the all-pass part to achieve the removal of reverberation. The obtained enhanced speech signal is transmitted to the speech signal speed-adjusted module S3.

It may be understood that processing orders of the single channel echo canceler, the noise canceler, and the reverberation canceler to the to-be-detected speech signal may be adjusted according to situations. For example, a to-be-detected speech signal is first processed by the noise canceler, then is processed by the reverberation canceler, and finally is processed by the single channel echo canceler. The order shown in FIG. 4 is only an example, and is not to be understood as a limitation to the present disclosure.

Once again, in the embodiments of the present disclosure, a method of performing speech enhancement on a to-be-detected speech signal collected by a single microphone is described. That is, a keyword detection apparatus first receives a to-be-detected speech signal through a single speech input device, and then processes the to-be-detected speech signal through at least one of an echo cancellation algorithm, a noise cancellation algorithm, and a reverberation cancellation algorithm, to obtain an enhanced speech signal. Through the foregoing manners, a single channel speech may be enhanced by using at least one of an echo cancellation algorithm, a noise cancellation algorithm, and a reverberation cancellation algorithm. The enhancement processing on the single channel speech is relatively simple, and not only the to-be-detected speech signal can be collected, but also the to-be-detected speech signal can be enhanced effectively, so that the feasibility and operability of the solution are improved.

In one embodiment, based on the embodiment corresponding to FIG. 3, if the to-be-detected speech signal is a speech signal received through a plurality of speech input devices, the foregoing operation of processing the to-be-detected speech signal through a speech enhancement algorithm, to obtain an enhanced speech signal may include:

processing the to-be-detected speech signal through an echo cancellation algorithm and/or a reverberation cancellation algorithm, to obtain a first to-be-processed signal, the echo cancellation algorithm being used for canceling an echo signal in the to-be-detected speech signal, the reverberation cancellation algorithm being used for canceling a reverberation in the to-be-detected speech signal, and the first to-be-processed signal including a plurality of channels of signals (e.g., each channel corresponding to one of the plurality of speech input devices);

performing spatial filtering processing on the first to-be-processed signal through a beamforming algorithm to obtain a second to-be-processed signal, the second to-be-processed signal including one channel of signal; and suppressing stationary noise and non-stationary noise in the second to-be-processed signal through a noise cancellation algorithm, to obtain the enhanced speech signal.

The keyword detection apparatus may receive a to-be-detected speech signal through a plurality of speech input devices. Alternatively, another device may receive a to-be-detected speech signal through a plurality of speech input devices, and then the another device transmits the to-be-detected speech signal to the keyword detection apparatus for a subsequent keyword detection.

Figure 5:
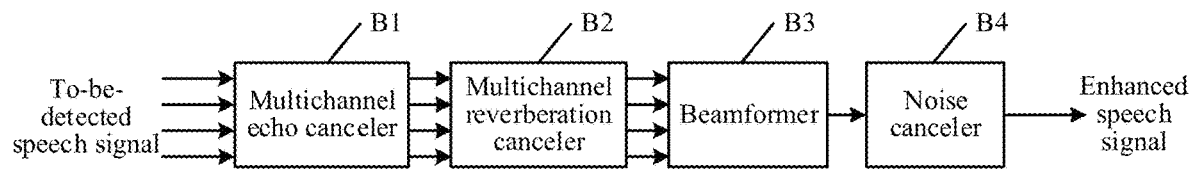
FIG. 5 is a schematic diagram of an embodiment of performing speech enhancement on a signal of a plurality of microphones according to an embodiment of the present disclosure.

In one embodiment, based on that the audio collection module S1 and the speech enhancement module S2 shown in FIG. 2 generally have a relatively strong coupling relationship, for example, for an audio collection system of a plurality of microphones, generally different speech enhancement modules S2 are required to achieve an optimal speech enhancement effect. When an audio collection system of a plurality of microphones is adopted, an embodiment of the speech enhancement module is shown in FIG. 5. FIG. 5 is a schematic diagram of an embodiment of performing speech enhancement on a signal of a plurality of microphones according to an embodiment of the present disclosure. As shown in the figure, a to-be-detected speech signal received by a plurality of speech input devices is inputted into a multichannel echo canceler B1, and the plurality of speech input devices may be specifically a microphone array. An example of an array of 4 microphones is shown in FIG. 5, and in an actual application, the microphone array may be greater than or equal to 2 microphones.

The multichannel echo canceler B1 performs cancellation processing on an echo signal in the to-be-detected speech signal by using an echo cancellation algorithm, and the echo cancellation algorithm includes, but is not limited to an RLS and an LMS, specifically, The multichannel echo cancellation B1 performs echo cancellation on each channel of inputted microphone signal separately, obtains 4 channels of speech signals after the echo is canceled, and transmits the speech signals to a multichannel reverberation canceler B2.

The multichannel reverberation canceler B2 adopts a weighted prediction error (WPE) algorithm or other algorithms to suppress the reverberation in each channel of microphone signals, to reduce the interference of the reverberation in the room to the articulation of a target keyword speech, so as to obtain a first to-be-processed signal, and the first to-be-processed signal includes a plurality of channels of speech signals.

The 4 channels of first to-be-processed signals after the echo and the reverberation are canceled continue to be transmitted to a beamformer B3. The beamformer B3 adopts, for example, a generalized side lobe cancellation (GSC) or a minimum variance distortionless response (MVDR) adaptive beamformer, to perform spatial filtering on the target keyword speech, so as to reduce the interference of noise from other directions in the space to the keyword speech to obtain a second to-be-processed signal, and the second to-be-processed signal includes a one-channel speech signal. Microphone array technology is widely used to suppress some directional interference speech. That's where beamforming comes in. Because retaining a speech signal of a desired direction and suppressing a signal of a non-desired direction is exactly the beamforming of a speech signal. Research on microphone array beamforming may be mainly divided into three categories, which respectively are fixed beamforming, adaptive beamforming, and post-filtering algorithm.

The beamformer B3 outputs a channel of second to-be-processed signal of a target direction, and transmits the second to-be-processed signal into a noise canceler B4 for further suppressing stationary noise (for example, stable noise of an air conditioner or a refrigerator), to finally obtain an enhanced speech signal.

It may be understood that processing orders of the multichannel echo canceler and the multichannel reverberation canceler to the to-be-detected speech signal may be adjusted according to situations. For example, a to-be-detected speech signal is first processed by the multichannel reverberation canceler, and then is processed by the multichannel echo canceler. The order shown in FIG. 5 is only an example, and is not to be understood as a limitation to the present disclosure.

Once again, in the embodiments of the present disclosure, a method of performing speech enhancement on a to-be-detected speech signal collected by a plurality of microphones is described. That is, a keyword detection apparatus first receives a to-be-detected speech signal through a plurality of speech input devices, and then processes the to-be-detected speech signal through an echo cancellation algorithm and/or a reverberation cancellation algorithm to obtain a first to-be-processed signal, and then performs spatial filtering processing on the first to-be-processed signal through a beamforming algorithm to obtain a second to-be-processed signal, the second to-be-processed signal including one channel of signal, and finally, the keyword detection apparatus suppresses stationary noise and/or non-stationary noise in the second to-be-processed signal through a noise cancellation algorithm to obtain an enhanced speech signal.

Through the foregoing manner, a multi-array speech may be enhanced. An advantage of a multi-array speech enhancement method is that position information of a sound source is considered, and spatial filtering may be implemented, so that there is a better suppression effect on directional noise, and therefore the feasibility and operability of the solution are improved.

In one embodiment, based on the embodiment corresponding to FIG. 3 the performing speed adjustment on the enhanced speech signal to obtain a first speed-adjusted speech signal may include:

writing the enhanced speech signal into a first First In First Out (FIFO) cache;

reading a to-be-processed enhanced speech signal from the first FIFO cache when a storage threshold of the first FIFO cache is reached, a duration of the to-be-processed enhanced speech signal being less than or equal to a duration of the enhanced speech signal; and performing speed adjustment on the to-be-processed enhanced speech signal to obtain a target speed-adjusted speech signal, the first speed-adjusted speech signal including the target speed-adjusted speech signal, a duration of the target speed-adjusted speech signal being less than or equal to a duration of the first speed-adjusted speech signal.

In one embodiment, after the target speed-adjusted speech signal is obtained, the target speed-adjusted speech signal is written into a second FIFO cache.

Correspondingly, the obtaining a first speech feature signal according to the first speed-adjusted speech signal includes:

reading the target speed-adjusted speech signal from the second FIFO cache; and generating the first speech feature signal according to the target speed-adjusted speech signal, the first speech feature signal including at least one of a mel frequency cepstral coefficient (MFCC) feature signal, filter banks (Fbanks), and a linear prediction cepstrum coefficient (LPCC).

In one embodiment, how to perform speed adjustment on the enhanced speech signal by using the FIFO cache is described. That is, after obtaining the enhanced speech signal, the keyword detection apparatus may perform speed adjustment on the enhanced speech signal by using any one of a signal variable sampling, an overlap-add (OLA) method, a synchronous over lap-add (SOLA) method, a time domain pitch synchronous over lap-add (TD-PSOLA) method, and a waveform similarity over-lap add (WSOLA), to obtain the first speed-adjusted speech signal. An example in which the speed adjustment is performed on the enhanced speech signal by using the WSOLA is used in the present disclosure. It is to be understood that this does not constitute a limitation to the present disclosure.

Figure 6:
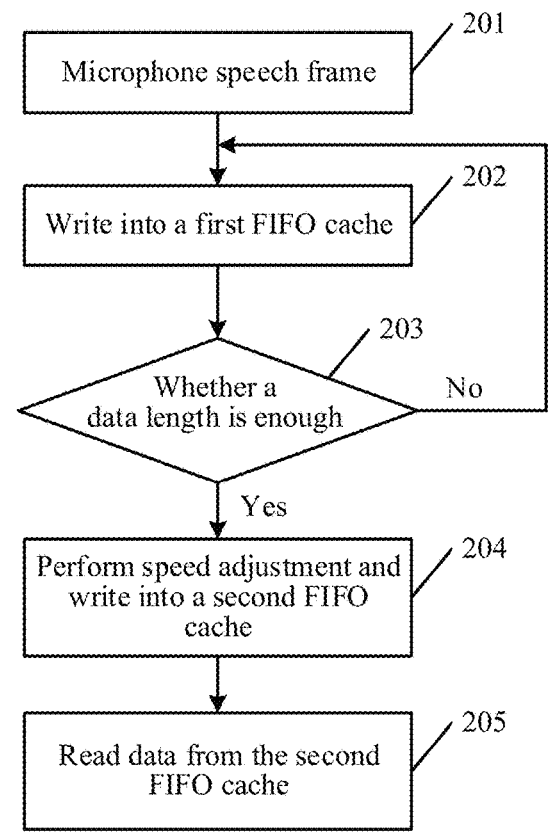
FIG. 6 is a schematic flowchart of performing speed adjustment on an enhanced speech signal according to an embodiment of the present disclosure.

If decelerating the enhanced speech signal is beneficial to detecting a target keyword in a fast speech speed speech, the speech speed of the enhanced speech signal may be slowed down by using a WSOLA algorithm, and then the first speed-adjusted speech signal is transmitted to a feature extractor for acoustic feature extraction. For ease of understanding, FIG. 6 is a schematic flowchart of performing speed adjustment on an enhanced speech signal according to an embodiment of the present disclosure. As shown in the figure, a processing procedure based on WSOLA specifically includes the following steps.

Step 201. Perform framing processing on an enhanced speech signal first, to obtain a microphone speech frame, for example, a length of every 16 milliseconds (ms) is a microphone speech frame. It may be understood that, in an actual application, the framing processing may alternatively not be performed on the enhanced speech signal, and step 201 is an optional step.

If the framing is required, a variable-length audio is to be cut into segments of a fixed length, and this step is referred to as framing. Generally, 10 ms to 30 ms is a frame. To avoid an omit of a signal by a window border, so that when offsetting a frame, a frame overlap is required (that is, the frames need to overlap with each other). Generally, a half of a frame length is used as a frame shift, that is, a next frame is used after a half of the current frame is shifted. In this case, characteristics differences between the frames may be prevented from being too large. Generally, each frame is 25 ms, and the frame overlap is 10 ms. The next operation is performed on a single frame. Generally, the framing is performed because the speech signal changes rapidly, and the Fourier transform is adapted to analyze stable signals. Therefore, during speech recognition, the frame length is usually 10 ms to 30 ms, and in this case, there are enough cycles in a frame without changing too dramatically. Each frame of speech signal is usually multiplied by a smooth window function, both ends of the frame are attenuated smoothly to zero, so that intensity of side lobes after a Fourier transform may be reduced and a spectrum with higher quality may be obtained. A time difference between frames is usually 10 ms, and in this case, the frames are overlapped. Otherwise, signals at a joint of the frames may be attenuated because of window adding, and information of this part is lost. The Fourier transform is performed frame by frame, so as to obtain a spectrum of each frame.

Step 202. Write the enhanced speech signal into the first FIFO cache, the enhanced speech signal may be a speech signal after the framing, or may be a speech signal without framing, this is not limited herein. Store the enhanced speech signal into a specified size in time sequence to be inputted into the first FIFO cache. A FIFO memory is divided into a writing dedicated area and a reading dedicated area, and the first FIFO cache is the writing dedicated area, and therefore, the first FIFO cache is also referred to as an input FIFO cache. It may be understood that, reading operation and writing operation may be performed asynchronously, written enhanced speech signals in the writing dedicated area are read out from the reading dedicated area according to a writing order.

Step 203. Determine whether the enhanced speech signal in the first FIFO cache reaches a minimum speech length required for a speed-adjusted algorithm. Generally, the first FIFO cache may store enhanced speech signals of 200 ms, and the speed-adjusted algorithm may be performed with only 100 ms, and therefore, if the enhanced speech signal reaches 100 ms, step 204 is performed; and otherwise, step 202 continues to be performed, that is, an enhanced speech signal continues to be written into the first FIFO cache. In an actual application, whether the first FIFO cache reaches the minimum speech length required for the speed-adjusted algorithm may be detected. If the first FIFO cache reaches the minimum speech length, this part of enhanced speech signal may be extracted for subsequent processing. If there are remaining enhanced speech signals in the first FIFO cache, the next processing may be performed waiting for a subsequent input of enhanced speech signals to make up 100 ms.

Step 204. Perform once speed adjustment on the enhanced speech signal in the first FIFO cache when a detected data length of the first FIFO cache reaches the minimum speech length required for the speed-adjusted algorithm, and write the first speed-adjusted speech signal after the speed adjustment into the second FIFO cache. The second FIFO cache is the reading dedicated area. It may be understood that a data quantity size of once speed adjustment is the minimum speech length required for the speed-adjusted algorithm. Assuming that the minimum speech length required for the speed-adjusted algorithm is an enhanced speech signal of 100 ms, the enhanced speech signal of 100 ms is a to-be-processed enhanced speech signal. It may be understood that a duration of the to-be-processed enhanced speech signal is less than or equal to a duration of the enhanced speech signal. Therefore, the speed adjustment may be performed on the to-be-processed enhanced speech signal to obtain a target speed-adjusted speech signal, a duration of the target speed-adjusted speech signal is less than or equal to a duration of the first speed-adjusted speech signal. That is, the target speed-adjusted speech signal is a part of the first speed-adjusted speech signal, and when the speed adjustment is performed on all the enhanced speech signals, an entire first speed-adjusted speech signal may be obtained.

Step 205. Read the target speed-adjusted speech signal from the second FIFO cache, extract acoustic features from the target speed-adjusted speech signal, and repeat step 202 to step 204 until all feature signals in the first speed-adjusted speech signal are extracted, that is, the first speech feature signal is obtained, the first speech feature signal including at least one of an MFCC feature signal, Fbanks, and an LPCC.

It may be understood that the first speech feature signal includes at least one of the MFCC feature signal, the Fbanks, and the LPCC. The MFCC mel frequency is provided based on the hearing characteristics of human ears, and it has a nonlinear correspondence with the Hertz frequency. The MFCC calculates a Hertz frequency feature by using the relationship therebetween. The MFCC is mainly used for speech data feature extraction and operation dimension reduction. The FBank feature extraction needs to be performed after the preprocessing. In this case, the speech signal is framed, and the FBank feature needs to be extracted frame by frame. The FBank processes the speech signal in a manner similar to human ears, which may improve the speech recognition performance. Generally, the MFCC is performed based on FBank, and therefore, the calculation amount of the MFCC is larger, the FBank feature correlation is relatively high, and the MFCC has better degree of discriminant. The LPCC is based on a linear frequency scale. The LPCC is a linear approximation speech at all frequencies, and this is different from the hearing features of human ears, and the LPCC includes most noise details of the high frequency speech.

Once again, in one embodiment of the present disclosure, a procedure of performing speed adjustment on an enhanced speech signal is described. That is, a keyword detection apparatus first writes an enhanced speech signal into a first FIFO cache, and reads a to-be-processed enhanced speech signal from the first FIFO cache when a storage threshold of the first FIFO cache is reached, and then the keyword detection apparatus performs speed adjustment on the to-be-processed enhanced speech signal to obtain a target speed-adjusted speech signal, and writes the target speed-adjusted speech signal into a second FIFO cache. The keyword detection apparatus reads the target speed-adjusted speech signal from the second FIFO cache, and generates a first speech feature signal according to the target speed-adjusted speech signal. Through the foregoing manner, a speech signal is processed by using a FIFO cache, and the coherence of the speech signal can be ensured. Continuous speech signal flows are cached by using the FIFO cache, and data may be prevented from being lost during the storage operation. In addition, the speech signal may be concentrated for processing and storage, which may avoid frequent bus operations, so as to reduce the load of the processor.

In one embodiment, based on the pervious embodiment corresponding to FIG. 3, the performing speed adjustment on the to-be-processed enhanced speech signal to obtain a target speed-adjusted speech signal may include:

determining a first speech frame according to the to-be-processed enhanced speech signal, a first sample number, and an analysis frame stride;

calculating natural continuous speech frames according to the first speech frame, the first sample number, and a synthetic stride;

determining a second speech frame according to the to-be-processed enhanced speech signal and the analysis frame stride;

obtaining a second sample number according to the second speech frame and the natural continuous speech frames;

determining a to-be-matched speech frame according to the to-be-processed enhanced speech signal, the second sample number, and the analysis frame stride; and determining the target speed-adjusted speech signal according to the first speech frame and the to-be-matched speech frame.

Figure 7A:
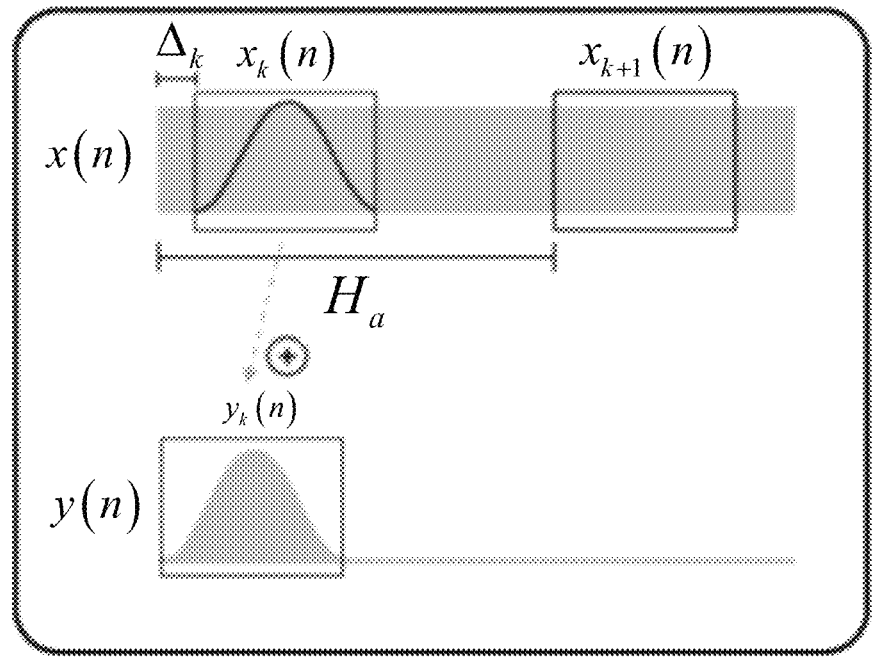
FIG. 7A is a schematic diagram of an embodiment of performing speed adjustment based on a waveform similarity over-lap add (WSOLA) method according to an embodiment of the present disclosure.

In one embodiment, a manner of performing speed adjustment on a to-be-processed enhanced speech signal is described. The speed adjustment is implemented through framing iteration calculation. For ease of description, the manner of performing the speed adjustment is described with reference to accompanying drawings below. FIG. 7A is a schematic diagram of an embodiment of performing speed adjustment based on a WSOLA method according to an embodiment of the present disclosure. As shown in the figure, $x(n)$ represents an inputted to-be-processed enhanced speech signal, $\Delta_k$ represents a first sample number, that is, a number of left and right moving samples that need to be calculated for an $k^{th}$ frame, and the left and right moving does not exceed $\Delta_{max}$, that is, $\Delta_k \in [-\Delta_{max}:\Delta_{max}]$. $H_a$ represents an analysis frame stride, that is, a predefined input speech frame, a larger $H_a$ indicating a faster speech speed, and a smaller $H_a$ indicating a slower speech speed, $x_k(n)$ represents a first speech frame, $y(n)$ represents an outputted speech signal, $y_k(n)$ represents an output speech frame corresponding to the first speech frame, and a speech frame with a length of a $k^{th}$ frame being N in an inputted to-be-processed enhanced speech signal is:

$$x_k(n)=x(n+kH_a+\Delta_k),\ n\in[-N/2:N/2-1];$$

for example, N=32, $H_a$=128, $\Delta_k$=0;

assuming that k=5, $x_5(n)=(5\times128-16:5\times128+15)$;

assuming that k=6, $x_6(n)=(6\times128-16:6\times128+15)$; and adding a triangular window to the first speech frame to obtain an output speech frame:

$$y_k(n)=w(n)x_k(n),\ n\in[-N/2:N/2-1];$$

where $w(n)$ is a triangular window with a length being N, or may be a window function such as a Hanning window or another forms.

Figure 7B:
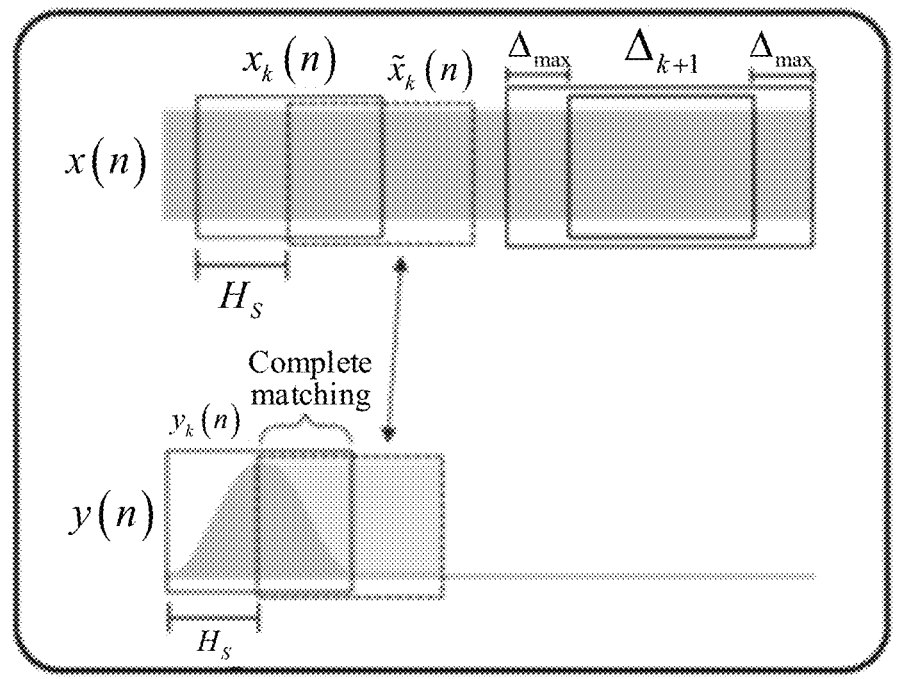
FIG. 7B is a schematic diagram of an embodiment of performing speed adjustment based on a WSOLA method according to an embodiment of the present disclosure.

FIG. 7B is a schematic diagram of an embodiment of performing speed adjustment based on a WSOLA method according to an embodiment of the present disclosure. As shown in the figure, $H_S$ represents a synthetic stride, $\tilde{x}_k(n)$ represents natural continuous speech frames, and a calculation manner of the natural continuous speech frames is that:

$$\tilde{x}_k(n)=x(n+kH_a+\Delta_k+H_S),\ n\in[-N/2:N/2-1];$$

for example, N=32, $H_a$=128, $\Delta_k$=0, $H_S$=20;

assuming that k=5, $\tilde{x}_5(n)$=(5×128−16+20:5×128+15+20); and determining a second speech frame according to the to-be-processed enhanced speech signal and the analysis frame stride; $x_{k+1}(n)$ represents the second speech frame, that is:

$$x_{k+1}(n)=x(n+(k+1)H_a), n\in[-N/2:N/2-1];$$

Figure 7C:
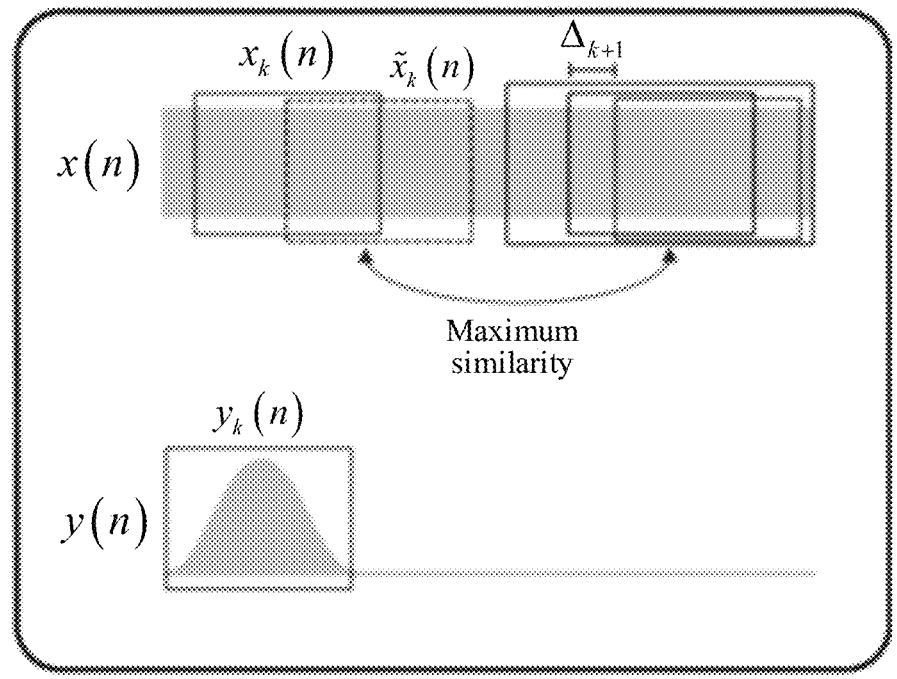
FIG. 7C is a schematic diagram of an embodiment of performing speed adjustment based on a WSOLA method according to an embodiment of the present disclosure.
Figure 7D:
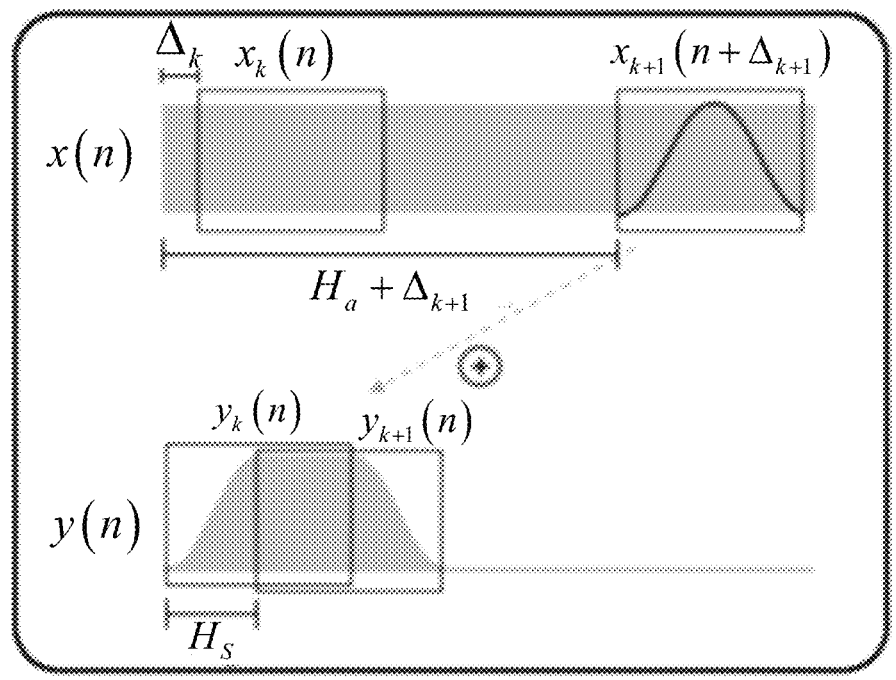
FIG. 7D is a schematic diagram of an embodiment of performing speed adjustment based on a WSOLA method according to an embodiment of the present disclosure.

FIG. 7C is a schematic diagram of an embodiment of performing speed adjustment based on a WSOLA method according to an embodiment of the present disclosure. As shown in the figure, if two speech frames need to be superimposed, the two speech frames need to be the most similar, that is, the required second sample number $\Delta_{k+1}$ can enable the natural continuous speech frames $\tilde{x}_k(n)$ and $x_{k+1}(n+\Delta_{k+1})$ to be the most similar. FIG. 7D is a schematic diagram of an embodiment of performing speed adjustment based on a WSOLA method according to an embodiment of the present disclosure. As shown in the figure, after the second sample number $\Delta_{k+1}$ is calculated, the to-be-matched speech frame may be determined according to the to-be-processed enhanced speech signal, the second sample number, and the analysis frame stride, and $x_{k+1}(n+\Delta_{k+1})$ represents the to-be-matched speech frame, that is:

$$x_{k+1}(n+\Delta_{k+1})=x(n+(k+1)H_a+\Delta_{k+1}), n\in[-N/2:N/2-1];$$

and finally, the to-be-matched speech frame is outputted, and the first speech frame and the to-be-matched speech frame are synthesized to obtain a target speed-adjusted speech signal, and y(n) represents a target speed-adjusted speech signal obtained after the shift and superposition are performed, that is:

$$y(n) = \sum_k y_k(n - kH_S);$$

where $kH_S$ is a shift length, and the foregoing mentioned $\Delta_{k+1}$ needs to calculate each frame of input, that is, to perform an iteration calculation. An example of once calculation is used for description, and details are not repeated.

Once again, in one embodiment of the present disclosure, a method of performing deceleration on a speech signal by using the WSOLA is described. That is, a first speech frame is first obtained according to a to-be-processed enhanced speech signal, a first sample number, and an analysis frame stride, and then natural continuous speech frames are calculated according to the first speech frame, the first sample number, and a synthetic stride, and a second speech frame is determined according to the to-be-processed enhanced speech signal and the analysis frame stride, and then a second sample number is obtained according to the second speech frame and the natural continuous speech frames, and then the second speech frame is determined according to the to-be-processed enhanced speech signal, the second sample number, the analysis frame stride, and finally a target speed-adjusted speech signal is obtained according to the first speech frame and the second speech frame. Through the foregoing manner, an inputted speech signals are not directly superimposed after being decomposed into speech frames, instead, to-be-superimposed speech frames are looked up in a certain range. The speech frame needs to satisfy a condition to be the most similar to a speech frame at the original position, so as to obtain a synthetic speech frame with a relatively low degree of distortion.

In one embodiment, based on the previous embodiment corresponding to FIG. 3, the obtaining a second sample number according to the second speech frame and the natural continuous speech frames may include:

calculating the second sample number in the following manner:

$$\Delta_{k+1} = \underset{\Delta_{k+1}\in[-\Delta max:\Delta max]}{\mathrm{argmin}} c_A(k, \Delta_{k+1});$$

$$c_A(k, \Delta_{k+1}) = \sum_{n=1}^{N} |\tilde{x}_k(n) - x_{k+1}(n + \Delta_{k+1})|;$$

where $\Delta_{k+1}$ represents the second sample number, $c_A(k, \Delta_{k+1})$ represents a minimum cross average magnitude difference function (cross-AMDF) coefficient of two speech frames, k represents an $k^{th}$ speech frame, $\Delta$ represents a sample number, $\tilde{x}_k(n)$ represents the natural continuous speech frames, Amax represents a maximum sample number that can be moved, $x_{k+1}(n+\Delta_{k+1})$ represents the to-be-matched second speech frame, arg min represents a variable value when $c_A(k, \Delta_{k+1})$ takes a minimum value, and n is an integer greater than or equal to 1 and less than or equal to N.

In one embodiment, how to calculate the two most similar speech frames are specifically described. The manner of calculating the two most similar speech frames may be that, calculating a $\Delta_{k+1}$ that has a minimum normalized cross-relation number or has a minimum cross-AMDF coefficient.

An example of calculating a minimum cross-AMDF of the two speech frames is used, that is:

$$c_A(k, \Delta_{k+1}) = \sum_{n=1}^{N} |\tilde{x}_k(n) - x_{k+1}(n + \Delta_{k+1})|;$$

then a $\Delta_{k+1}$ obtained according to the minimum cross-AMDF is:

$$\Delta_{k+1} = \underset{\Delta_{k+1}\in[-\Delta max:\Delta max]}{\mathrm{argmin}} c_A(k, \Delta_{k+1});$$

and therefore, the second sample number $\Delta_{k+1}$ is obtained.

Further, in one embodiment of the present disclosure, a specific manner of obtaining a second sample number according to a second speech frame and natural continuous speech frames is provided, that is, the two most similar speech frames may be obtained by using the minimum cross-AMDF coefficient. Through the foregoing manner, the two most similar speech frames are synthesized into a frame, and not only an original speech speed may be slower down, but also the degree of distortion can be reduced, and therefore, the feasibility and operability of the solution are improved.

In one embodiment, based on the embodiment corresponding to FIG. 3, after the obtaining a first keyword detection result corresponding to the first speech feature signal by using a keyword detection model, the method further includes:

determining, when the keyword detection result is a first character, that the target keyword exists in the to-be-detected speech signal according to the first character; and determining, when the keyword detection result is a second character, that the target keyword does not exist in the to-be-detected speech signal according to the second character.

In one embodiment, after a first speech feature signal is inputted into a keyword detection model, a keyword detection result may be outputted through the keyword detection model. The keyword detection result may be a binary notation, and assuming that the keyword detection result is the first character (for example, 1), it indicates that the target keyword exists in the to-be-detected speech signal. Assuming that the keyword detection result is the second character (for example, 0), it indicates that the target keyword does not exist in the to-be-detected speech signal.

It may be understood that, the keyword detection model may be a conventional hidden Markov model (HMM), or may include one or more of the following neural network models, such as feed forward neural networks (FFNN), radial basis function (RBF), hopfield network (HN), markov chain (MC), boltzmann machines (BM), restricted boltzmann machines (RBM), autoencoders (AE), sparse autoencoders (SAE), deep neural network (DNN), variational autoencoders (VAE), denoising autoencoders (DAE), deep belief networks (DBN), convolutional neural networks (CNN), deconvolutional networks (DN), deep convolutional inverse graphics networks (DCIGN), generative adversarial networks (GAN), recurrent neural networks (RNN), long short term memory (LSTM), gated recurrent units (GRU), deep residual networks (DRN), neural Turing machines (NTM), echo state networks (ESN), extreme learning machines (ELM), liquid state machines (LSM), and support vector machines (SVM).

In addition, in one embodiment of the present disclosure, a method of determining a keyword detection result is described. That is, after a keyword detection result corresponding to a first speech feature signal is obtained through a keyword detection model, if the keyword detection result is a first character, it is determined that a target keyword exists in a to-be-detected speech signal according to the first character, and if the keyword detection result is a second character, it is determined that the target keyword does not exist in the to-be-detected speech signal according to the second character. Through the foregoing manner, the keyword detection model directly outputs a binary notation, and the binary notation may directly represent a result whether a target keyword is included, which is more intuitive, and therefore, the detection efficiency is improved.

In one embodiment, based on the embodiment corresponding to FIG. 3, after the obtaining a first keyword detection result corresponding to the first speech feature signal by using a keyword detection model, the method further includes:

determining a target probability value according to the keyword detection result;

determining, when the target probability value is greater than or equal to a keyword probability threshold, that the target keyword exists in the to-be-detected speech signal; and determining, when the target probability value is less than the keyword probability threshold, that the target keyword does not exist in the to-be-detected speech signal.

In one embodiment, after a first speech feature signal is inputted into a keyword detection model, a keyword detection result may be outputted through the keyword detection model. The keyword detection result may be a target probability value, for example, 0.6 or 0.8. Generally, a larger probability value indicates a larger probability that the target keyword is detected. Therefore, whether the target keyword is included may be determined according to the target probability value, and if the target probability value is greater than or equal to a keyword probability threshold, it is determined that the target keyword exists in the to-be-detected speech signal. Otherwise, if the target probability value is less than the keyword probability threshold, it is determined that the target keyword does not exist in the to-be-detected speech signal.

It may be understood that, the keyword detection model may be a conventional HMM, or may include one or more of the following neural network models, such as FFNN, RBF, FIN, MC, BM, RBM, AE, SAE, DNN, VAE, DAE, DBN, CNN, DN, CIGN, GAN, RNN, LSTM, GRU, DRN, NTM, ESN, ELM, LSM, and SVM.

In addition, in one embodiment of the present disclosure, another method of determining a keyword detection result is described. That is, after a keyword detection result corresponding to a first speech feature signal is obtained through a keyword detection model, a target probability value is determined according to the keyword detection result, and if the target probability value is greater than or equal to a keyword probability threshold, it is determined that a target keyword exists in a to-be-detected speech signal, and if the target probability value is less than the keyword probability threshold, it is determined that the target keyword does not exist in the to-be-detected speech signal. Through the foregoing manner, probabilities of possible target keywords are outputted by a keyword detection model, and a final result is determined according to the probabilities, which is more conducive to improving the detection accuracy.

In one embodiment, based on FIG. 3, after the obtaining an enhanced speech signal of a to-be-detected speech signal, the method may further include:

obtaining a second speech feature signal according to the enhanced speech signal, the second speech feature signal being corresponding to a second speech speed, the second speech speed being consistent with a target speech speed; and obtaining a second keyword detection result corresponding to the second speech feature signal.

In one embodiment, a second keyword detection result corresponding to the second speech feature signal is obtained through a keyword detection model.

Figure 8:
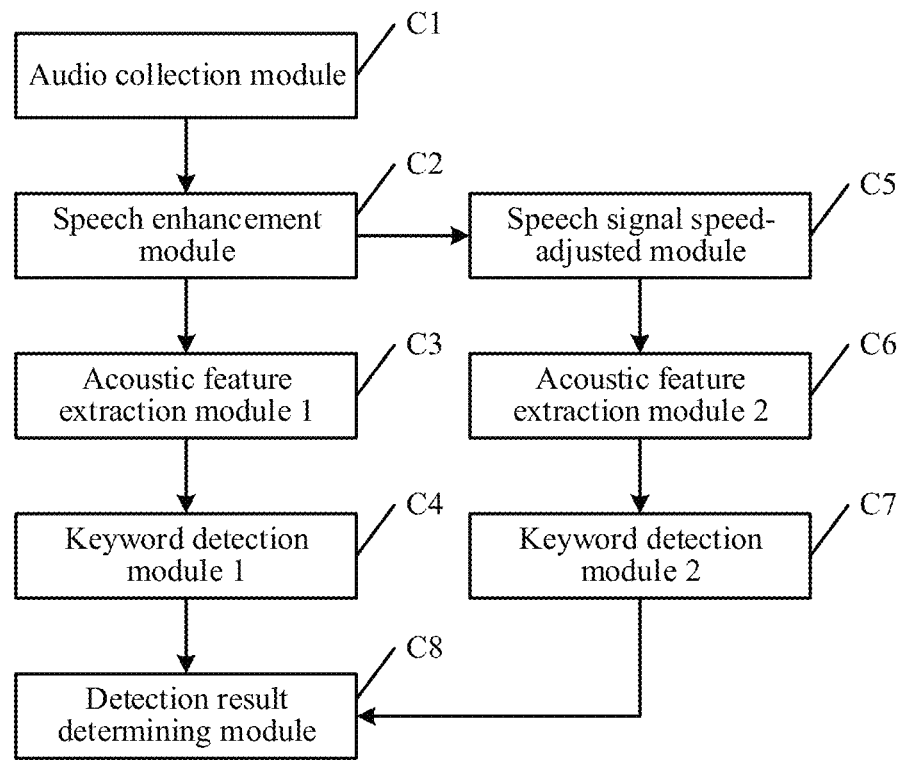
FIG. 8 is a schematic diagram of an embodiment of performing keyword detection based on two channels of speech signals according to an embodiment of the present disclosure.

In one embodiment, a keyword detection method including both the speed adjustment and unadjusted speed processing is described. For ease of description, FIG. 8 is a schematic diagram of an embodiment of performing keyword detection based on two channels of speech signals according to an embodiment of the present disclosure. As shown in the figure, first, an audio collection module C1 collects a to-be-detected speech signal, and then a speech enhancement module C2 enhances the to-be-detected speech signal to obtain an enhanced speech signal. Then the enhanced speech signal is divided into two channels of speech signals for separate processing. The first channel of speech signal is a speech signal obtained by not performing speed adjustment on the enhanced speech signal, that is, the speech enhancement module C2 inputs the enhanced speech signal into a first acoustic feature extraction module C3, to output a second speech feature signal, the second speech feature signal being corresponding to a second speech speed, and the second speech speed being consistent with a target speech speed, that is, the speech speed of the second speech feature signal is not processed. A first keyword detection module C4 performs keyword detection on the second speech feature signal.

The second channel of speech signal is a speech signal obtained by performing speed adjustment (may be an acceleration or may be a deceleration) on the enhanced speech signal by using a speech signal speed-adjusted module C5, that is, a speech enhancement module C2 inputs the enhanced speech signal into the speech signal speed-adjusted module C5, and the speech signal speed-adjusted module C5 performs speed adjustment on the enhanced speech signal to obtain a first speed-adjusted speech signal, the first speed-adjusted speech signal being corresponding to a first speech speed, and the first speech speed being different from the target speech speed (may be faster than the target speech speed or may be slower than the target speech speed). A second acoustic feature extraction module C6 extracts a first speech feature signal from the first speed-adjusted speech signal, and a second keyword detection module C7 performs keyword detection on the first speech feature signal. When a keyword of a fast speech speed is not detected in a normal speech speed case, a keyword in the other channel of speech signal may be detected when the speech speed is slowed down.

It may be understood that, in an actual application, in order to save detection time and further to improve the detection efficiency, a detection result determining module C8 monitors output results of the first keyword detection module C4 and the second keyword detection module C7 in real time. When one of the first keyword detection module C4 and the second keyword detection module C7 detects a keyword, the module declares that the target keyword is detected and resets the entire system, and there is no need to wait for the other keyword detection module to detect the target keyword.

In addition, in one embodiment of the present disclosure, a manner of processing two channels of speech signals is described. That is, after obtaining an enhanced speech signal of a to-be-detected speech signal, a keyword detection apparatus may obtain a second speech feature signal according to the enhanced speech signal, and then obtain a keyword detection result corresponding to a first speech feature signal through a keyword detection model, or obtain a second keyword detection result corresponding to the second speech feature signal through a keyword detection model, or obtain the keyword detection results corresponding to the first speech feature signal and the second speech feature signal through the keyword detection model. Through the foregoing manner, feature extraction may be performed on both the two channels of enhanced speech signals with an adjusted speed and an unadjusted speed, and then whether a keyword exists in the two channels of signals may be detected simultaneously. When at least one channel of speech signal is detected to have a target keyword, it may be determined that the target keyword exists. On the one hand, the detection accuracy may be improved, on the other hand, the detection efficiency may also be improved.

In one embodiment, based on the previous embodiment corresponding to FIG. 3, after the obtaining an enhanced speech signal of a to-be-detected speech signal, the method may further include:

determining whether the current enhanced speech signal is in an echo signal canceling state (e.g., determining whether echo signal cancellation is being performed on the current enhanced speech signal);

performing, in response to that the current enhanced speech signal is in the echo signal canceling state, an operation of obtaining a second speech feature signal according to the enhanced speech signal, and performing an operation of obtaining a second keyword detection result corresponding to the second speech feature signal (e.g., the detection result being obtained according to just the second keyword detection result); and performing, in response to that the current enhanced speech signal is not in the echo signal canceling state, an operation of obtaining a first speech feature signal according to the first speed-adjusted speech signal, and performing an operation of obtaining a second speech feature signal according to the enhanced speech signal (e.g., the detection result being obtained according to both the first keyword detection result and the second keyword detection result).

Figure 9:
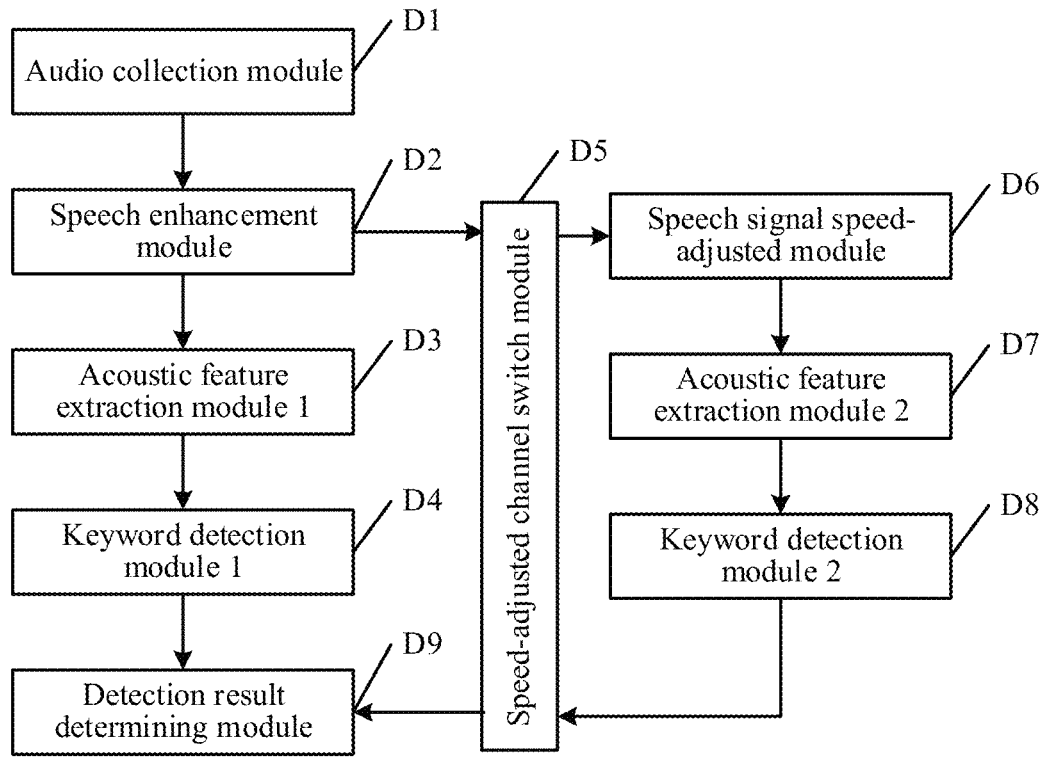
FIG. 9 is a schematic diagram of an embodiment of controlling a plurality of channels of speech signals to detect a keyword according to an embodiment of the present disclosure.

In one embodiment, in a case of processing a plurality of channels of speech signals at the same time, the calculation amount of a processor is increased accordingly. In order to reduce the calculation amount of an algorithm in a specific scenario, a switchable speech signal processing mode is provided. For ease of description, FIG. 9 is a schematic diagram of an embodiment of controlling a plurality of channels of speech signals to detect a keyword according to an embodiment of the present disclosure. As shown in the figure, a speed-adjusted channel switch module D5 is further added in FIG. 9 based on FIG. 8, and the speed-adjusted channel switch module D5 is configured to turn off a speed-adjusted channel in a specific scenario.

Specifically, when the speech enhancement module D2 performs echo cancellation on single channel or a plurality of channels of signals, the speed-adjusted channel may be turned off. That is, after obtaining an enhanced speech signal, the speech enhancement module D2 needs to determine whether the current enhanced speech signal is in an echo signal canceling state. If the current enhanced speech signal is in the echo signal canceling state, a detection result determining module D9 determines whether a target keyword is detected only according to a detection result of the first keyword detection module D4. That is, the speech enhancement module D2 inputs the enhanced speech signal into a first acoustic feature extraction module D3, to output a second speech feature signal, the second speech feature signal being corresponding to a second speech speed, and the second speech speed being consistent with a target speech speed, that is, the speech speed of the second speech feature signal is not processed. A first keyword detection module D4 performs keyword detection on the second speech feature signal.

The speech enhancement module D2 only monitors results of a constant speed channel and a speed-adjusted channel only when not performing echo cancellation on single channel or a plurality of channels of speech signals. That is, after obtaining an enhanced speech signal, the speech enhancement module D2 needs to determine whether the current enhanced speech signal is in an echo signal canceling state. If the current enhanced speech signal is not in the echo signal canceling state, the detection result determining module D9 may determine whether a target keyword is detected according to a detection result of the first keyword detection module D4 and/or a detection result of the second keyword detection module D8 together. That is, a processing procedure of one channel of speech signal is that: the speech enhancement module D2 inputs the enhanced speech signal into a first acoustic feature extraction module D3, to output a second speech feature signal, the second speech feature signal being corresponding to a second speech speed, and the second speech speed being consistent with a target speech speed, that is, the speech speed of the second speech feature signal is not processed. A first keyword detection module D4 performs keyword detection on the second speech feature signal. A processing procedure of the other channel of speech signal is that: a speech signal speed-adjusted module D6 performs speed adjustment (may be an acceleration or may be a deceleration) on an enhanced speech signal, that is, the speech enhancement module D2 inputs the enhanced speech signal into the speech signal speed-adjusted module D6, and the speech signal speed-adjusted module D6 performs speed adjustment on the enhanced speech signal to obtain a first speed-adjusted speech signal, the first speed-adjusted speech signal being corresponding to a first speech speed, and the first speech speed being different from the target speech speed (may be faster than the target speech speed or may be slower than the target speech speed). A second acoustic feature extraction module D7 extracts a first speech feature signal from the first speed-adjusted speech signal, and a second keyword detection module D8 performs keyword detection on the first speech feature signal. When a keyword of a fast speech speed is not detected in a normal speech speed case, a keyword in the other channel of speech signal may be detected when the speech speed is slowed down.

A specific scenario may be that, for example, in a smart sound box, when the sound box is playing music, an echo of a speaker is collected by a microphone, and therefore, a speech collected by the microphone is interfered. In this case, an echo cancellation module in a speech enhancement module needs to be turned on to cancel the echo, so that a load of a processor is increased. In this case, the echo may be canceled by turning off a speed-adjusted channel through a speed-adjusted channel switch module to reduce the calculation amount.

Once again, in one embodiment of the present disclosure, a manner of switching a speech speed processing mode is provided. That is, after obtaining an enhanced speech signal of a to-be-detected speech signal, a keyword detection apparatus may further determine whether the current enhanced speech signal is in an echo signal canceling state. If the current enhanced speech signal is in the echo signal canceling state, a procedure of detecting a target keyword in two channels of signals at the same time is performed. Otherwise, if the current enhanced speech signal is not in the echo signal canceling state, the speed adjustment is not performed, and the detection is only performed on a current-received speech signal. Through the foregoing manner, a speech speed adjustment mode may be turned off in a specific scenario. When an echo is collected by a microphone to further interfere with a speech collected by the microphone, the echo needs to be canceled preferentially, and therefore, a load of a processor is increased. In this case, turning off a speech signal speed adjustment mode may effectively reduce the calculation amount of the processor.

In one embodiment, based on FIG. 3, after the obtaining an enhanced speech signal of a to-be-detected speech signal, the method may further include:

obtaining a second speech feature signal according to the enhanced speech signal, the second speech feature signal being corresponding to a second speech speed, the second speech speed being consistent with a target speech speed; and performing speed adjustment on the enhanced speech signal to obtain a second speed-adjusted speech signal, the second speed-adjusted speech signal being corresponding to a third speech speed, the third speech speed being greater than the target speech speed, the third speech speed being greater than the first speech speed, and the first speech speed being less than the target speech speed;

obtaining a third speech feature signal according to the second speed-adjusted speech signal; and obtaining a third keyword detection result corresponding to the third speech feature signal.

In one embodiment, a third keyword detection result corresponding to the third speech feature signal is obtained through a keyword detection model.

Figure 10:
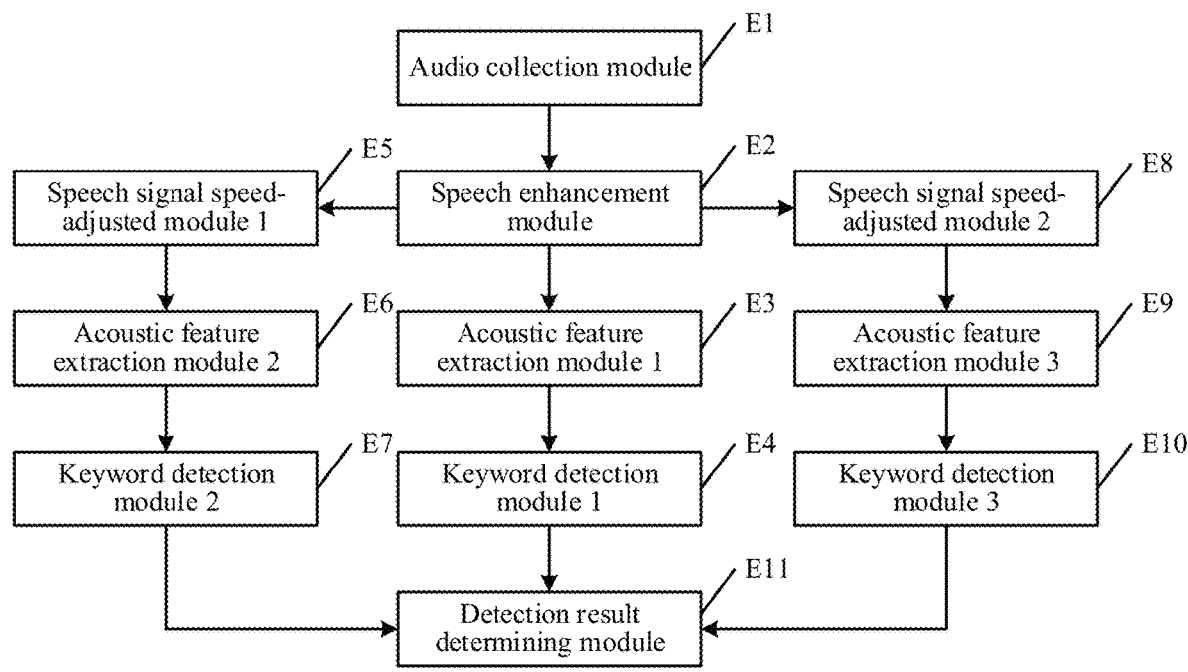
FIG. 10 is a schematic diagram of an embodiment of performing keyword detection based on three channels of speech signals according to an embodiment of the present disclosure.

In one embodiment, a keyword detection method including a speech speed acceleration, a speech speed deceleration, and a speech speed-unadjusted processing is described. For ease of description, FIG. 10 is a schematic diagram of an embodiment of performing keyword detection based on three channels of speech signals according to an embodiment of the present disclosure. As shown in the figure, first, an audio collection module E1 collects a to-be-detected speech signal, and then a speech enhancement module E2 enhances the to-be-detected speech signal to obtain an enhanced speech signal. Then the enhanced speech signal is divided into three channels of speech signals for separate processing. The first channel of speech signal is a speech signal obtained by not performing speed adjustment on the enhanced speech signal, that is, the speech enhancement module E2 inputs the enhanced speech signal into a first acoustic feature extraction module E3, to output a second speech feature signal, the second speech feature signal being corresponding to a second speech speed, and the second speech speed being consistent with a target speech speed, that is, the speech speed of the second speech feature signal is not processed. A first keyword detection module E4 performs keyword detection on the second speech feature signal.

The second channel of speech signal is a speech signal obtained by performing deceleration on the enhanced speech signal by using a speech signal speed-adjusted module E5, that is, a speech enhancement module E2 inputs the enhanced speech signal into a first speech signal speed-adjusted module E5, and the first speech signal speed-adjusted module E5 performs deceleration on the enhanced speech signal to obtain a first speed-adjusted speech signal, the first speed-adjusted speech signal being corresponding to a first speech speed, and the first speech speed being slower than the target speech speed. A second acoustic feature extraction module E6 extracts a first speech feature signal from the first speed-adjusted speech signal, and a second keyword detection module E7 performs keyword detection on the first speech feature signal.

The third channel of speech signal is a speech signal obtained by performing acceleration on the enhanced speech signal by using a speech signal speed-adjusted module E8, that is, the speech enhancement module E2 inputs the enhanced speech signal into a second speech signal speed-adjusted module E8, and the second speech signal speed-adjusted module E8 performs acceleration on the enhanced speech signal to obtain a second speed-adjusted speech signal, the second speed-adjusted speech signal being corresponding to a third speech speed, and the third speech speed being faster than the target speech speed. A third acoustic feature extraction module E9 extracts a third speech feature signal from the second speed-adjusted speech signal, and a third keyword detection module E10 performs keyword detection on the third speech feature signal.

It may be understood that, in an actual application, in order to save detection time and further to improve the detection efficiency, a detection result determining module E1*l* monitors output results of the first keyword detection module C4, the second keyword detection module C7, and a third keyword detection module C10 in real time. When one of the first keyword detection module C4, the second keyword detection module C7, and the third keyword detection module C10 detects a keyword, the module declares that the target keyword is detected and resets the entire system, and there is no need to wait for another keyword detection module to detect the target keyword.

In addition, in one embodiment of the present disclosure, a manner of processing three channels of speech signals is described. That is, a keyword detection apparatus obtains a second speech feature signal according to an enhanced speech signal, and performs speed adjustment on the enhanced speech signal to obtain a second speed-adjusted speech signal. Then the keyword detection apparatus obtains a keyword detection result corresponding to a first speech feature signal through a keyword detection model, or obtains a second keyword detection result corresponding to the second speech feature signal through the keyword detection model, or obtains a keyword detection results corresponding to a third speech feature signal through the keyword detection model, or obtains the keyword detection results corresponding to the first speech feature signal, the second speech feature signal, and a third speech feature signal through the keyword detection model. Through the foregoing manner, feature extraction may be performed on three channels of enhanced speech signals with an acceleration, a deceleration, and an unadjusted speed, and then whether a keyword exists in the three channels of signals may be detected simultaneously. When at least one channel of speech signal is detected to have a target keyword, it may be determined that the target keyword exists. On the one hand, the detection accuracy may be improved to a greater extent, on the other hand, the detection efficiency may also be improved to a greater extent.

Figure 11:
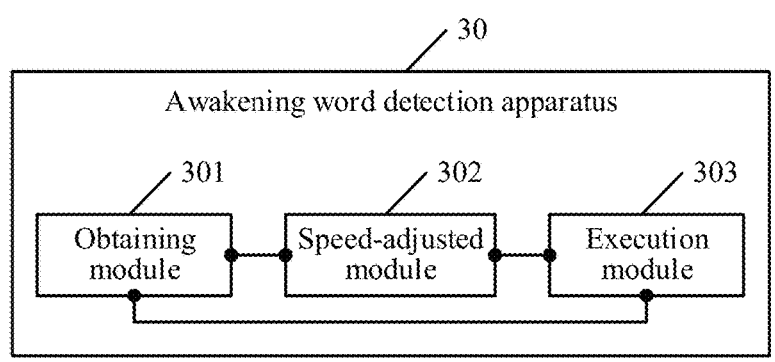
FIG. 11 is a schematic diagram of an embodiment of a keyword detection apparatus according to an embodiment of the present disclosure.

A keyword detection apparatus in the present disclosure is described below in detail. FIG. 11 is a schematic diagram of an embodiment of a keyword detection apparatus according to an embodiment of the present disclosure. The keyword detection apparatus may be a computer device described above, or may be disposed in the computer device. A keyword detection apparatus 30 may include:

an obtaining module 301, configured to obtain an enhanced speech signal of a to-be-detected speech signal, the enhanced speech signal being corresponding to a target speech speed;

a speed-adjusted module 302, configured to perform speed adjustment on the enhanced speech signal obtained by the obtaining module to obtain a first speed-adjusted speech signal, the first speed-adjusted speech signal being corresponding to a first speech speed, the first speech speed being different from the target speech speed, the obtaining module 301 being further configured to obtain a first speech feature signal according to the first speed-adjusted speech signal obtained after the speed-adjusted module performs the speed adjustment, the obtaining module 301 being further configured to obtain a first keyword detection result corresponding to the first speech feature signal, the keyword detection result indicating whether a target keyword exists in the to-be-detected speech signal; and an execution module 303, configured to perform an operation corresponding to the target keyword in response to determining that the target keyword exists according to the keyword detection result obtained by the obtaining module 301.

In one embodiment of the present disclosure, a keyword detection apparatus is provided. The keyword detection apparatus obtains an enhanced speech signal of a to-be-detected speech signal, the enhanced speech signal being corresponding to a target speech speed, then the keyword detection apparatus performs speed adjustment on the enhanced speech signal to obtain a first speed-adjusted speech signal, the first speed-adjusted speech signal being corresponding to a first speech speed, the first speech speed being different from the target speech speed; and obtains a first speech feature signal according to the first speed-adjusted speech signal; and finally, the keyword detection apparatus obtains a first keyword detection result corresponding to the first speech feature signal, the keyword detection result indicating whether a target keyword exists in the to-be-detected speech signal. Through the foregoing manner, signal enhancement processing and speed adjustment need to be performed on a to-be-detected speech signal before detecting a keyword. Enhancing a speech signal may effectively improve the speech recognition quality, and further to perform the speed adjustment on the enhanced signal, and therefore, the detection rate of keywords in fast speech or slow speech is improved.

In one embodiment, based on the embodiment corresponding to FIG. 11, in another embodiment of the keyword detection apparatus 30 provided in one embodiment of the present disclosure, the obtaining module 301 is specifically configured to obtain the to-be-detected speech signal; and process the to-be-detected speech signal through a speech enhancement algorithm, to obtain the enhanced speech signal.

In addition, in the embodiments of the present disclosure, a method of obtaining enhanced speech information is provided. That is, a keyword detection apparatus obtains a to-be-detected speech signal, and then the keyword detection apparatus processes the to-be-detected speech signal through a speech enhancement algorithm, to obtain an enhanced speech signal. Through the foregoing manners, the speech enhancement can be implemented by using the speech enhancement algorithm. The speech enhancement refers to the extraction of useful speech signals from the noise background and the suppression and reduction of noise interference when a to-be-detected speech signal is interfered or even drowned by various kinds of noise. Thus, an original speech as pure as possible can be extracted from the to-be-detected speech signal, so as to improve the accuracy of detecting a target keyword. Therefore, using the speech enhancement technology to preprocess the to-be-detected speech signal can effectively improve the system performance, and improve the recognition rate and anti-interference capability of the system.

In one embodiment, based on the embodiment corresponding to FIG. 11, in another embodiment of the keyword detection apparatus 30 provided in one embodiment of the present disclosure, the to-be-detected speech signal is a speech signal received through a single speech input device.

The obtaining module 301 is specifically configured to process the to-be-detected speech signal through at least one of an echo cancellation algorithm, a noise cancellation algorithm, and a reverberation cancellation algorithm, to obtain the enhanced speech signal, the echo cancellation algorithm being used for canceling an echo signal in the to-be-detected speech signal, the noise cancellation algorithm being used for suppressing stationary noise and/or non-stationary noise in the to-be-detected speech signal, and the reverberation cancellation algorithm being used for canceling a reverberation in the to-be-detected speech signal.

In one embodiment, the obtaining module 301 is further configured to receive the to-be-detected speech signal through a single speech input device.

Once again, in the embodiments of the present disclosure, a keyword detection apparatus for performing speech enhancement on a to-be-detected speech signal collected by a single microphone is described. That is, the keyword detection apparatus first receives a to-be-detected speech signal through a single speech input device, and then processes the to-be-detected speech signal through at least one of an echo cancellation algorithm, a noise cancellation algorithm, and a reverberation cancellation algorithm, to obtain an enhanced speech signal. Through the foregoing manners, a single channel speech may be enhanced by using at least one of an echo cancellation algorithm, a noise cancellation algorithm, and a reverberation cancellation algorithm. The enhancement processing on the single channel speech is relatively simple, and not only the to-be-detected speech signal can be collected, but also the to-be-detected speech signal can be enhanced effectively, so that the feasibility and operability of the solution are improved.

In one embodiment, based on the embodiment corresponding to FIG. 11, in another embodiment of the keyword detection apparatus 30 provided in one embodiment of the present disclosure, the to-be-detected speech signal is a speech signal received through a plurality of speech input devices.

The obtaining module 301 is specifically configured to process the to-be-detected speech signal through an echo cancellation algorithm and/or a reverberation cancellation algorithm, to obtain a first to-be-processed signal, the echo cancellation algorithm being used for canceling an echo signal in the to-be-detected speech signal, the reverberation cancellation algorithm being used for canceling a reverberation in the to-be-detected speech signal, and the first to-be-processed signal including a plurality of channels of signals;

performing spatial filtering processing on the first to-be-processed signal through a beamforming algorithm to obtain a second to-be-processed signal, the second to-be-processed signal including one channel of signal; and suppressing stationary noise and non-stationary noise in the second to-be-processed signal through a noise cancellation algorithm, to obtain the enhanced speech signal.

In one embodiment, the obtaining module 301 is further configured to receive the to-be-detected speech signal through a plurality of speech input devices.

Once again, in the embodiments of the present disclosure, a keyword detection apparatus for performing speech enhancement on a to-be-detected speech signal collected by a plurality of microphones is described. That is, a keyword detection apparatus first receives a to-be-detected speech signal through a plurality of speech input devices, and then processes the to-be-detected speech signal through an echo cancellation algorithm and/or a reverberation cancellation algorithm to obtain a first to-be-processed signal, and then performs spatial filtering processing on the first to-be-processed signal through a beamforming algorithm to obtain a second to-be-processed signal, the second to-be-processed signal including one channel of signal, and finally, the keyword detection apparatus suppresses stationary noise and/or non-stationary noise in the second to-be-processed signal through a noise cancellation algorithm to obtain an enhanced speech signal. Through the foregoing manner, a multi-array speech may be enhanced. An advantage of a multi-array speech enhancement method is that position information of a sound source is considered, and spatial filtering may be implemented, so that there is a better suppression effect on directional noise, and therefore the feasibility and operability of the solution are improved.

In one embodiment, based on the embodiment corresponding to FIG. 11, in another embodiment of the keyword detection apparatus 30 provided in one embodiment of the present disclosure, the speed-adjusted module 302 is specifically configured to write the enhanced speech signal into a first FIFO cache;

read a to-be-processed enhanced speech signal from the first FIFO cache when a storage threshold of the first FIFO cache is reached, a duration of the to-be-processed enhanced speech signal being less than or equal to a duration of the enhanced speech signal; and perform speed adjustment on the to-be-processed enhanced speech signal to obtain a target speed-adjusted speech signal, the first speed-adjusted speech signal including the target speed-adjusted speech signal, a duration of the target speed-adjusted speech signal being less than or equal to a duration of the first speed-adjusted speech signal.

In one embodiment, the speed-adjusted module 302 is further configured to write the target speed-adjusted speech signal into a second FIFO cache.

The obtaining module 301 is specifically configured to read the target speed-adjusted speech signal from the second FIFO cache; and generate the first speech feature signal according to the target speed-adjusted speech signal, the first speech feature signal including at least one of an MFCC feature signal, Fbanks, and an LPCC.

Once again, in one embodiment of the present disclosure, a keyword detection apparatus for performing speed adjustment on an enhanced speech signal is described. That is, the keyword detection apparatus first writes an enhanced speech signal into a first FIFO cache, and reads a to-be-processed enhanced speech signal from the first FIFO cache when a storage threshold of the first FIFO cache is reached, and then the keyword detection apparatus performs speed adjustment on the to-be-processed enhanced speech signal to obtain a target speed-adjusted speech signal, and writes the target speed-adjusted speech signal into a second FIFO cache. The keyword detection apparatus reads the target speed-adjusted speech signal from the second FIFO cache, and generates a first speech feature signal according to the target speed-adjusted speech signal. Through the foregoing manner, a speech signal is processed by using a FIFO cache, and the coherence of the speech signal can be ensured. Continuous speech signal flows are cached by using the FIFO cache, and data may be prevented from being lost during the storage operation. In addition, the speech signal may be concentrated for processing and storage, which may avoid frequent bus operations, so as to reduce the load of the processor.

In one embodiment, based on the embodiment corresponding to FIG. 11, in another embodiment of the keyword detection apparatus 30 provided in one embodiment of the present disclosure, the speed-adjusted module 302 is specifically configured to determine a first speech frame according to the to-be-processed enhanced speech signal, a first sample number, and an analysis frame stride;

calculate natural continuous speech frames according to the first speech frame, the first sample number, and a synthetic stride;

determine a second speech frame according to the to-be-processed enhanced speech signal and the analysis frame stride;

obtain a second sample number according to the second speech frame and the natural continuous speech frames;

determine a to-be-matched speech frame according to the to-be-processed enhanced speech signal, the second sample number, and the analysis frame stride; and determine the target speed-adjusted speech signal according to the first speech frame and the to-be-matched speech frame.

Once again, in one embodiment of the present disclosure, a keyword detection apparatus for performing deceleration on a speech signal by using the WSOLA is described. That is, a first speech frame is first obtained according to a to-be-processed enhanced speech signal, a first sample number, and an analysis frame stride, and then natural continuous speech frames are calculated according to the first speech frame, the first sample number, and a synthetic stride, and a second speech frame is determined according to the to-be-processed enhanced speech signal and the analysis frame stride, and then a second sample number is obtained according to the second speech frame and the natural continuous speech frames, and then the second speech frame is determined according to the to-be-processed enhanced speech signal, the second sample number, the analysis frame stride, and finally a target speed-adjusted speech signal is obtained according to the first speech frame and the second speech frame. Through the foregoing manner, an inputted speech signals are not directly superimposed after being decomposed into speech frames, instead, to-be-superimposed speech frames are looked up in a certain range. The speech frame needs to satisfy a condition to be the most similar to a speech frame at the original position, so as to obtain a synthetic speech frame with a relatively low degree of distortion.

In one embodiment, based on the embodiment corresponding to FIG. 11, in another embodiment of the keyword detection apparatus 30 provided in one embodiment of the present disclosure, the speed-adjusted module 302 is specifically configured to calculate the second sample number in the following manner:

$$\Delta_{k+1} = \underset{\Delta_{k+1} \in [-\Delta max : \Delta max]}{\operatorname{argmin}} c_A(k, \Delta_{k+1});$$

$$\Delta_{k+1} = \underset{\Delta_{k+1} \in [-\Delta max : \Delta max]}{\operatorname{argmin}} c_A(k, \Delta_{k+1}),$$

where $\Delta_{k+1}$ represents the second sample number, $c_A(k, \Delta_{k+1})$ represents a minimum cross-AMDF coefficient of two speech frames, k represents an $k^{th}$ speech frame, A represents a sample number, $\tilde{x}_k(n)$ represents the natural continuous speech frames, Amax represents a maximum sample number that can be moved, $x_{k+1}$ ($n+\Delta_{k+1}$) represents the to-be-matched second speech frame, arg min represents a variable value when $c_A(k,\Delta_{k+1})$ takes a minimum value, and n is an integer greater than or equal to 1 and less than or equal to N.

Further, in one embodiment of the present disclosure, a specific manner of obtaining a second sample number according to a second speech frame and natural continuous speech frames is provided, that is, the two most similar speech frames may be obtained by using the minimum cross-AMDF coefficient. Through the foregoing manner, the two most similar speech frames are synthesized into a frame, and not only an original speech speed may be slower down, but also the degree of distortion can be reduced, and therefore, the feasibility and operability of the solution are improved.

Figure 12:
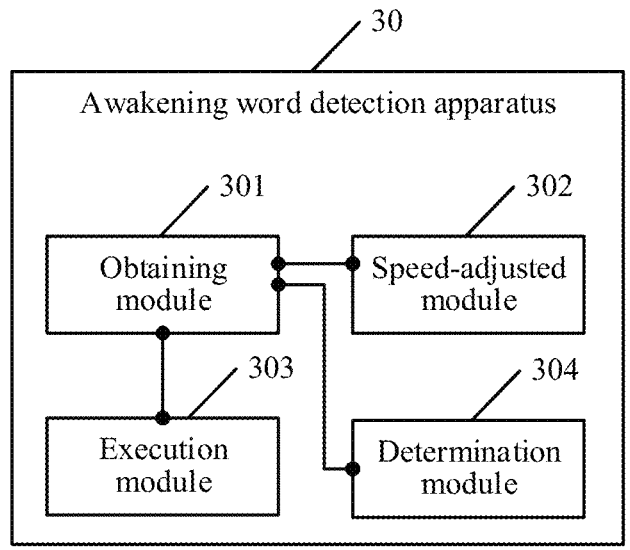
FIG. 12 is a schematic diagram of another embodiment of a keyword detection apparatus according to an embodiment of the present disclosure.

In one embodiment, based on the embodiment corresponding to FIG. 11, referring to FIG. 12, in another embodiment of the keyword detection apparatus 30 provided in the embodiments of the present disclosure, the keyword detection apparatus 30 further includes a determination module 304.

The determination module 304 is configured to determine, after the obtaining module 301 obtains a first keyword detection result corresponding to the first speech feature signal and when the keyword detection result is a first character, that the target keyword exists in the to-be-detected speech signal according to the first character.

The determination module 304 is further configured to determine, after the obtaining module 301 obtains a first keyword detection result corresponding to the first speech feature signal through a keyword detection model and when the keyword detection result is a second character, that the target keyword does not exist in the to-be-detected speech signal according to the second character.

In addition, in one embodiment of the present disclosure, a keyword detection apparatus for determining a keyword detection result is described. That is, after a keyword detection result corresponding to a first speech feature signal is obtained through a keyword detection model, if the keyword detection result is a first character, it is determined that a target keyword exists in a to-be-detected speech signal according to the first character, and if the keyword detection result is a second character, it is determined that the target keyword does not exist in the to-be-detected speech signal according to the second character. Through the foregoing manner, the keyword detection model directly outputs a binary notation, and the binary notation may directly represent a result whether a target keyword is included, which is more intuitive, and therefore, the detection efficiency is improved.

In one embodiment, based on the embodiment corresponding to FIG. 12, in another embodiment of the keyword detection apparatus 30 provided in the embodiments of the present disclosure, the keyword detection apparatus 30 further includes a determination module 304.

The determination module 304 is configured to determine, after the obtaining module 301 obtains a first keyword detection result corresponding to the first speech feature signal, a target probability value according to the keyword detection result.

The determination module 304 is further configured to determine, when the target probability value is greater than or equal to a keyword probability threshold, that the target keyword exists in the to-be-detected speech signal.

The determination module 304 is further configured to determine, when the target probability value is less than the keyword probability threshold, that the target keyword does not exist in the to-be-detected speech signal.

In addition, in one embodiment of the present disclosure, another keyword detection apparatus for determining a keyword detection result is described. That is, after a keyword detection result corresponding to a first speech feature signal is obtained through a keyword detection model, a target probability value is determined according to the keyword detection result, and if the target probability value is greater than or equal to a keyword probability threshold, it is determined that a target keyword exists in a to-be-detected speech signal, and if the target probability value is less than the keyword probability threshold, it is determined that the target keyword does not exist in the to-be-detected speech signal. Through the foregoing manner, probabilities of possible target keywords are outputted by a keyword detection model, and a final result is determined according to the probabilities, which is more conducive to improving the detection accuracy.

In one embodiment, based on the embodiment corresponding to FIG. 11 or FIG. 12, in another embodiment of the keyword detection apparatus 30 provided in one embodiment of the present disclosure, the obtaining module 301 is further configured to obtain, after obtaining an enhanced speech signal of a to-be-detected speech signal, a second speech feature signal according to the enhanced speech signal, the second speech feature signal being corresponding to a second speech speed, the second speech speed being consistent with the target speech speed.

The obtaining module 301 is further configured to obtain a second keyword detection result corresponding to the second speech feature signal.

In addition, in one embodiment of the present disclosure, a keyword detection apparatus for processing two channels of speech signals is described. That is, after obtaining an enhanced speech signal of a to-be-detected speech signal, a keyword detection apparatus may obtain a second speech feature signal according to the enhanced speech signal, and then obtain a keyword detection result corresponding to a first speech feature signal through a keyword detection model, or obtain a second keyword detection result corresponding to the second speech feature signal through a keyword detection model, or obtain the keyword detection results corresponding to the first speech feature signal and the second speech feature signal through the keyword detection model. Through the foregoing manner, feature extraction may be performed on both the two channels of enhanced speech signals with an adjusted speed and an unadjusted speed, and then whether a keyword exists in the two channels of signals may be detected simultaneously. When at least one channel of speech signal is detected to have a target keyword, it may be determined that the target keyword exists. On the one hand, the detection accuracy may be improved, on the other hand, the detection efficiency may also be improved.

Figure 13:
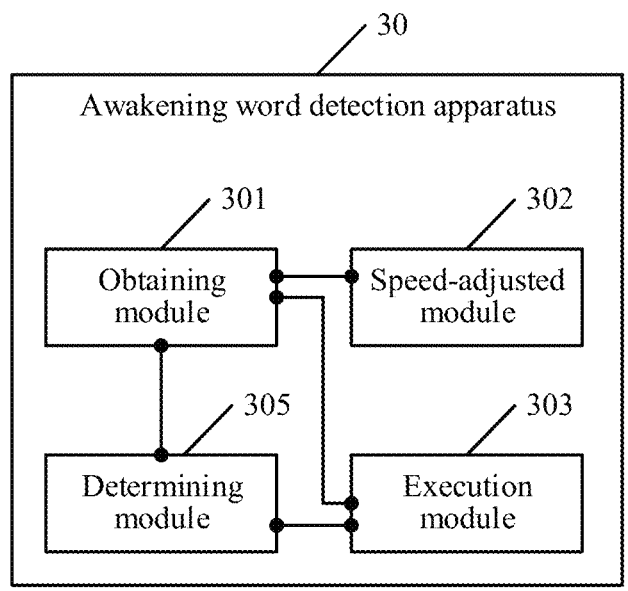
FIG. 13 is a schematic diagram of another embodiment of a keyword detection apparatus according to an embodiment of the present disclosure.

In one embodiment, based on the embodiment corresponding to FIG. 11 or FIG. 12, referring to FIG. 13, in another embodiment of the keyword detection apparatus 30 provided in the embodiments of the present disclosure, the keyword detection apparatus 30 further includes a determining module 305.

The determining module 305 is configured to determine, after the obtaining module 301 obtains an enhanced speech signal of a to-be-detected speech signal, whether the current enhanced speech signal is in an echo signal canceling state.

The execution module 303 is further configured to perform, in response to that the determining module 305 determines that the current enhanced speech signal is in the echo signal canceling state, the operation of obtaining a second speech feature signal according to the enhanced speech signal, and perform the operation of obtaining the second keyword detection result corresponding to the second speech feature signal.

The execution module 303 is further configured to perform, in response to that the determining module 305 determines that the current enhanced speech signal is not in the echo signal canceling state, the operation of obtaining a first speech feature signal according to the first speed-adjusted speech signal, and perform the operation of obtaining a second speech feature signal according to the enhanced speech signal.

Once again, in one embodiment of the present disclosure, a keyword detection apparatus for switching a speech speed processing mode is provided. That is, after obtaining an enhanced speech signal of a to-be-detected speech signal, the keyword detection apparatus may further determine whether the current enhanced speech signal is in an echo signal canceling state. If the current enhanced speech signal is in the echo signal canceling state, a procedure of detecting a target keyword in two channels of signals at the same time is performed. Otherwise, if the current enhanced speech signal is not in the echo signal canceling state, the speed adjustment is not performed, and the detection is only performed on a current-received speech signal. Through the foregoing manner, a speech speed adjustment mode may be turned off in a specific scenario. When an echo is collected by a microphone to further interfere with a speech collected by the microphone, the echo needs to be canceled preferentially, and therefore, a load of a processor is increased. In this case, turning off a speech signal speed adjustment mode may effectively reduce the calculation amount of the processor.

In one embodiment, based on the embodiment corresponding to FIG. 11 or FIG. 12, in another embodiment of the keyword detection apparatus 30 provided in one embodiment of the present disclosure, the obtaining module 301 is further configured to obtain, after obtaining an enhanced speech signal of a to-be-detected speech signal, a second speech feature signal according to the enhanced speech signal, the second speech feature signal being corresponding to a second speech speed, the second speech speed being consistent with the target speech speed.

The speed-adjusted module 302 is further configured to perform speed adjustment on the enhanced speech signal to obtain a second speed-adjusted speech signal, the second speed-adjusted speech signal being corresponding to a third speech speed, the third speech speed being greater than the target speech speed, the third speech speed being greater than the first speech speed, and the first speech speed being less than the target speech speed.

The obtaining module 301 is further configured to obtain a third speech feature signal according to the second speed-adjusted speech signal; and obtain the third keyword detection result corresponding to the third speech feature signal.

In addition, in one embodiment of the present disclosure, a keyword detection apparatus for processing three channels of speech signals is described. That is, a keyword detection apparatus obtains a second speech feature signal according to an enhanced speech signal, and performs speed adjustment on the enhanced speech signal to obtain a second speed-adjusted speech signal. Then the keyword detection apparatus obtains a keyword detection result corresponding to a first speech feature signal through a keyword detection model, or obtains a second keyword detection result corresponding to the second speech feature signal through the keyword detection model, or obtains a keyword detection results corresponding to a third speech feature signal through the keyword detection model, or obtains the keyword detection results corresponding to the first speech feature signal, the second speech feature signal, and a third speech feature signal through the keyword detection model. Through the foregoing manner, feature extraction may be performed on three channels of enhanced speech signals with an acceleration, a deceleration, and an unadjusted speed, and then whether a keyword exists in the three channels of signals may be detected simultaneously. When at least one channel of speech signal is detected to have a target keyword, it may be determined that the target keyword exists. On the one hand, the detection accuracy may be improved to a greater extent, on the other hand, the detection efficiency may also be improved to a greater extent.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 14:
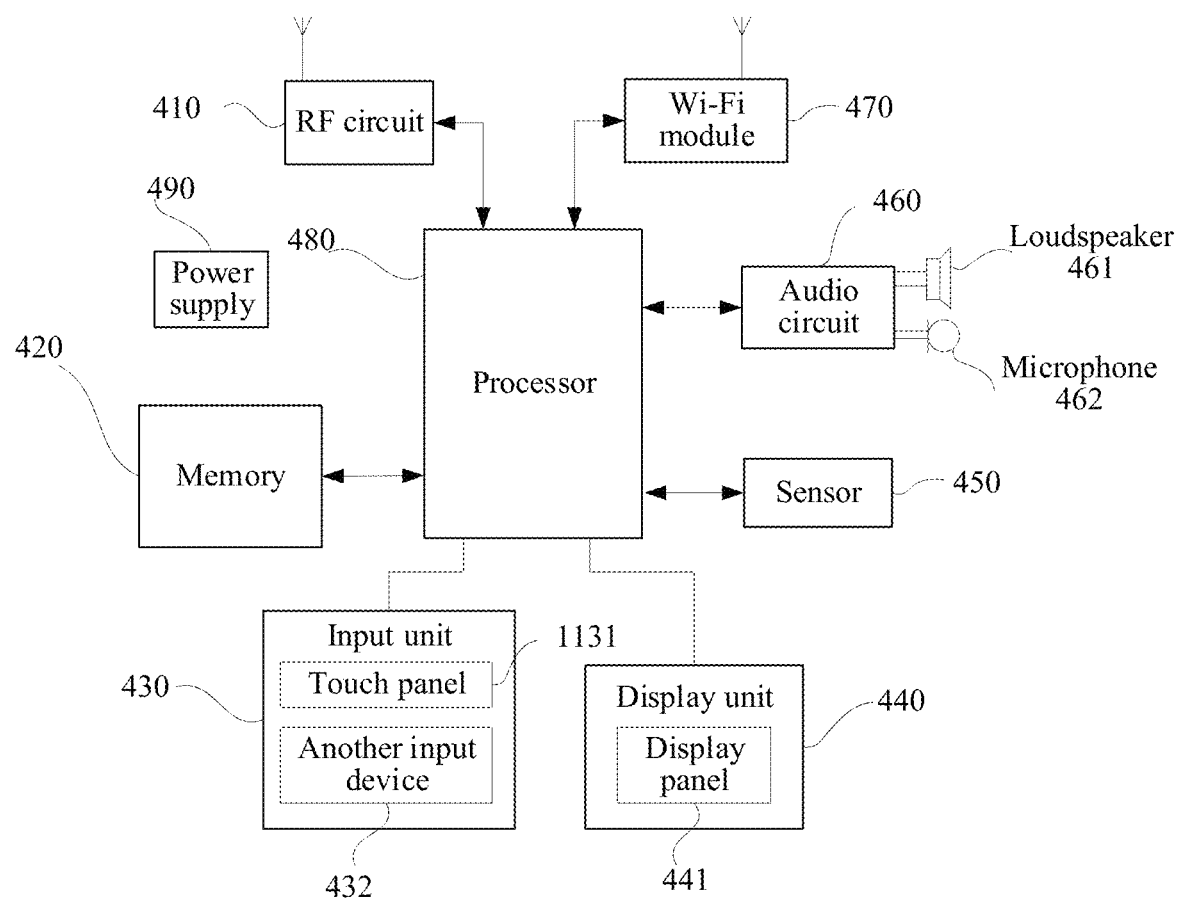
FIG. 14 is a schematic structural diagram of a smart device according to an embodiment of the present disclosure.

An embodiment of the present disclosure further provides another smart device. As shown in FIG. 14, for ease of description, only parts related to the embodiments of the present disclosure are shown. For specific technical details that are not disclosed, refer to the method part in the embodiments of the present disclosure. The smart device may be any smart device including a mobile phone, a tablet computer, a personal digital assistant (PDA), a point of sales (POS), and an on-board computer, and the smart device being a mobile phone is used as an example.

FIG. 14 is a block diagram of a structure of a part of a mobile phone related to a smart device according to an embodiment of the present disclosure. Referring to FIG. 14, the mobile phone includes components such as: a radio frequency (RF) circuit 410, a memory 420, an input unit 430, a display unit 440, a sensor 450, an audio circuit 460, a wireless fidelity (Wi-Fi) module 470, a processor 480, and a power supply 490. A person skilled in the art may understand that the structure of the mobile phone shown in FIG. 14 does not constitute a limitation on the mobile phone, and the mobile phone may include more components or fewer components than those shown in the figure, or some components may be combined, or a different component deployment may be used.

The following makes a specific description of components of the mobile phone with reference to FIG. 14.

The RF circuit 410 may be configured to receive and send signals during an information receiving and sending process or a call process. Specifically, the RF circuit receives downlink information from a base station, then delivers the downlink information to the processor 480 for processing, and sends designed uplink data to the base station. Usually, the RF circuit 410 includes, but is not limited to, an antenna, at least one amplifier, a transceiver, a coupler, a low noise amplifier (LNA), and a duplexer. In addition, the RF circuit 410 may also communicate with a network and another device through wireless communication. The wireless communication may use any communication standard or protocol, including but not limited to Global System for Mobile Communication (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 420 may be configured to store a software program and module. The processor 480 runs the software program and module stored in the memory 420, to implement various functional applications and data processing of the mobile phone. The memory 420 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 420 may include a high speed random access memory, and may also include a non-volatile memory, for example, at least one magnetic disk storage device, a flash memory, or another volatile solid-state storage device.

The input unit 430 may be configured to receive input digit or character information, and generate a keyboard signal input related to the user setting and function control of the mobile phone. Specifically, the input unit 430 may include a touch panel 431 and another input device 432. The touch panel 431, which may also be referred to as a touch screen, may collect a touch operation of a user on or near the touch panel (such as an operation of a user on or near the touch panel 431 by using any suitable object or accessory such as a finger or a stylus), and drive a corresponding connection apparatus according to a preset program. In one embodiment, the touch panel 431 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 480. Moreover, the touch controller can receive and execute a command transmitted from the processor 480. In addition, the touch panel 431 may be implemented by using various types, such as a resistive type, a capacitive type, an infrared type, and a surface acoustic wave type. In addition to the touch panel 431, the input unit 430 may further include the another input device 432. Specifically, the another input device 432 may include, but is not limited to, one or more of a physical keyboard, a functional key (such as a volume control key or a switch key), a track ball, a mouse, and a joystick.

The display unit 440 may be configured to display information inputted by the user or information provided for the user, and various menus of the mobile phone. The display unit 440 may include a display panel 441. In one embodiment, the display panel 441 may be configured by using a liquid crystal display (LCD), an organic light-emitting diode (OLED), or the like. Further, the touch panel 431 may cover the display panel 441. After detecting a touch operation on or near the touch panel, the touch panel 431 transfers the operation to the processor 480 to determine a touch event type. Then the processor 480 provides corresponding visual output on the display panel 441 according to the touch event type. Although in FIG. 14, the touch panel 431 and the display panel 441 are used as two separate parts to implement input and output functions of the mobile phone, in some embodiments, the touch panel 431 and the display panel 441 may be integrated to implement the input and output functions of the mobile phone.

The mobile phone may further include at least one sensor 450 such as an optical sensor, a motion sensor, and other sensors. Specifically, the optical sensor may include an ambient light sensor and a proximity sensor. The ambient light sensor may adjust luminance of the display panel 441 according to brightness of the ambient light. The proximity sensor may switch off the display panel 441 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 460, a loudspeaker 461, and a microphone 462 may provide audio interfaces between the user and the mobile phone. The audio circuit 460 may convert received audio data into an electrical signal and transmit the electrical signal to the loudspeaker 461. The loudspeaker 461 converts the electrical signal into a voice signal for output. On the other hand, the microphone 462 converts a collected voice signal into an electrical signal. The audio circuit 460 receives the electrical signal, converts the electrical signal into audio data, and outputs the audio data to the processor 480 for processing. Then, the processor transmits the audio data to, for example, another mobile phone by using the RF circuit 410, or outputs the audio data to the memory 420 for further processing.

Wi-Fi is a short distance wireless transmission technology. The mobile phone may help, by using the Wi-Fi module 470, a user receive and transmit an email, browse a web page, access stream media, and the like. This provides wireless broadband Internet access for the user. Although FIG. 14 shows the Wi-Fi module 470, it may be understood that the Wi-Fi module is not a necessary component of the mobile phone, and the Wi-Fi module may be omitted as required provided that the scope of the essence of the present disclosure is not changed.

The processor 480 is a control center of the mobile phone, and is connected to various parts of the entire mobile phone by using various interfaces and lines. By running or executing a software program and/or module stored in the memory 420, and invoking data stored in the memory 420, the processor executes various functions of the mobile phone and performs data processing, thereby monitoring the entire mobile phone. In one embodiment, the processor 480 may include one or more processing units. In one embodiment, the processor 480 may integrate an application processor and a modem processor. The application processor mainly processes an operating system, a user interface, an application program, and the like. The modem processor mainly processes wireless communication. It may be understood that the foregoing modem processor may not be integrated into the processor 480.

The mobile phone further includes the power supply 490 (such as a battery) for supplying power to the components. In one embodiment, the power supply may be logically connected to the processor 480 by using a power management system, thereby implementing functions such as charging, discharging, and power consumption management by using the power management system.

Although not shown in the figure, the mobile phone may further include a camera, a Bluetooth module, and the like, which are not further described herein.

In one embodiment of the present disclosure, the processor 480 included in the smart device further has the following functions:

obtaining an enhanced speech signal of a to-be-detected speech signal, the enhanced speech signal being corresponding to a target speech speed;

performing speed adjustment on the enhanced speech signal to obtain a first speed-adjusted speech signal, the first speed-adjusted speech signal being corresponding to a first speech speed, the first speech speed being different from the target speech speed;

obtaining a first speech feature signal according to the first speed-adjusted speech signal;

obtaining a first keyword detection result corresponding to the first speech feature signal through a keyword detection model, the keyword detection result indicating whether a target keyword exists in the to-be-detected speech signal; and performing an operation corresponding to the target keyword in response to determining that the target keyword exists according to the keyword detection result, and In one embodiment, the processor 480 is further configured to perform other operations described in the foregoing method embodiments, and this is not limited in the embodiments of the present disclosure.

Figure 15:
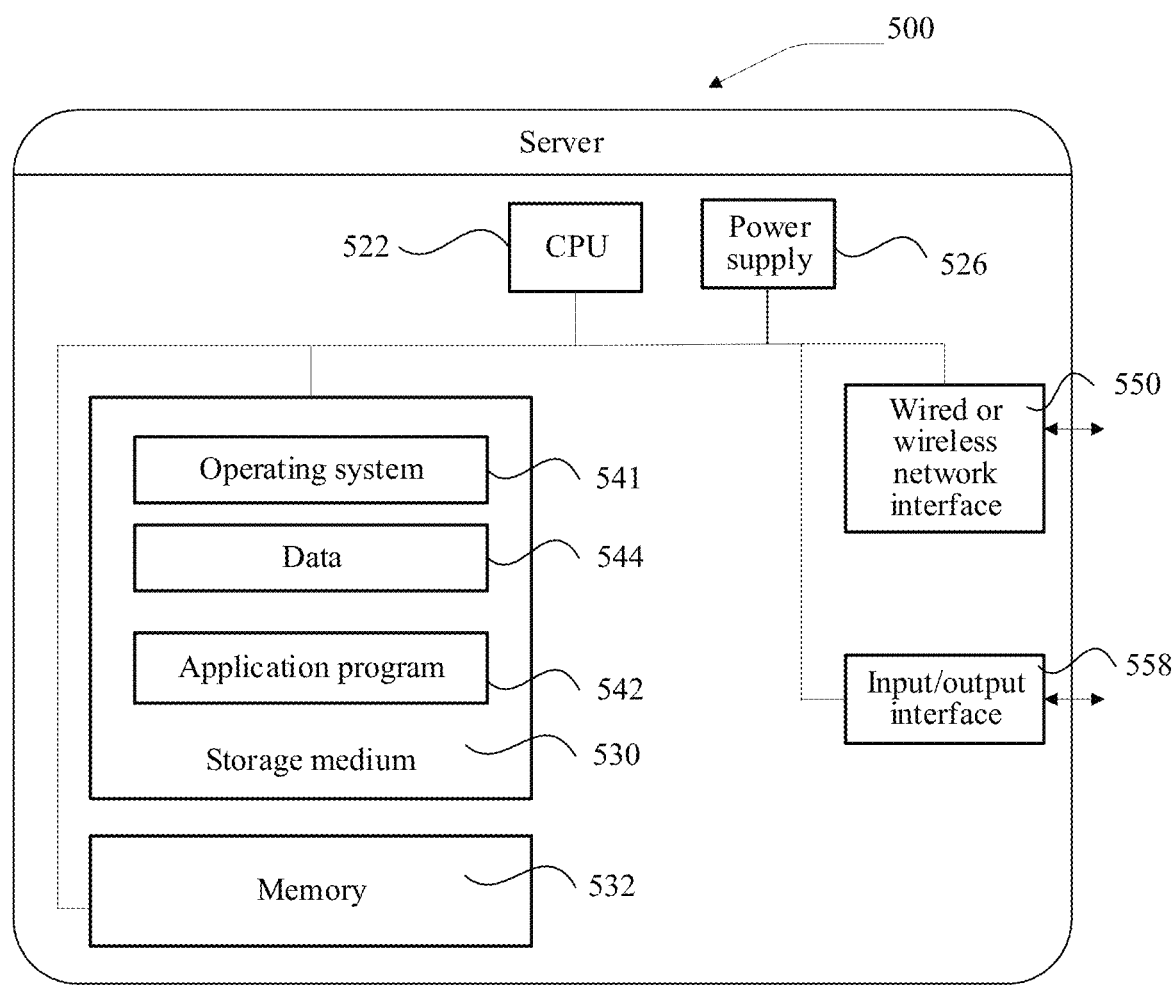
FIG. 15 is a schematic structural diagram of a server according to an embodiment of the present disclosure.

FIG. 15 is a schematic structural diagram of a server according to an embodiment of the present disclosure. The server 500 may vary greatly due to different configurations or performance, and may include one or more central processing units (CPU) 522 (for example, one or more processors) and a memory 532, and one or more storage media 530 (for example, one or more mass storage devices) that store application programs 542 or data 544. The memory 532 and the storage medium 530 may be temporary storage or persistent storage. A program stored in the storage medium 530 may include one or more modules (which are not marked in the figure), and each module may include a series of instruction operations on the server. Still further, the CPU 522 may be configured to communicate with the storage medium 530 to perform the series of instruction operations in the storage medium 530 on the server 500.

The server 500 may further include one or more power supplies 526, one or more wired or wireless network interfaces 550, one or more input/output interfaces 558, and/or one or more operating systems 541 such as Windows Server™, Mac OS X™, Unix™, Linux™, or FreeB SD™.

The steps performed by the server in the foregoing embodiments may be based on the server structure shown in FIG. 15.

In one embodiment of the present disclosure, the CPU 522 included in the server further has the following functions:

obtaining an enhanced speech signal of a to-be-detected speech signal, the enhanced speech signal being corresponding to a target speech speed;

performing speed adjustment on the enhanced speech signal to obtain a first speed-adjusted speech signal, the first speed-adjusted speech signal being corresponding to a first speech speed, the first speech speed being different from the target speech speed;

obtaining a first speech feature signal according to the first speed-adjusted speech signal; and obtaining a first keyword detection result corresponding to the first speech feature signal through a keyword detection model, the keyword detection result indicating whether a target keyword exists in the to-be-detected speech signal.

In one embodiment, The CPU 522 further has a function of performing other operations described in the foregoing method embodiments, and this is not limited in the embodiments of the present disclosure.

A person skilled in the art can clearly understand that for convenience and conciseness of description, for specific working processes of the foregoing systems, devices and units, reference may be made to the corresponding processes in the foregoing method embodiments, and details are not described herein again.

In the several embodiments provided in the present disclosure, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random-access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A keyword detection method, applied to a computer device, comprising:
    obtaining an enhanced speech signal of a to-be-detected speech signal, the enhanced speech signal corresponding to a target speech speed;
    performing speed adjustment on the enhanced speech signal to obtain a first speed-adjusted speech signal having a first speech speed, comprising:
        writing the enhanced speech signal into a cache;
        reading a to-be-processed enhanced speech signal from the cache when a storage threshold of the cache is reached, a duration of the to-be-processed enhanced speech signal being less than or equal to a duration of the enhanced speech signal; and
        performing speed adjustment on the to-be-processed enhanced speech signal to obtain a target speed-adjusted speech signal having the first speech speed, the first speed-adjusted speech signal comprising the target speed-adjusted speech signal, a duration of the target speed-adjusted speech signal being less than or equal to a duration of the first speed-adjusted speech signal, and the first speech speed being different from the target speech speed;
    obtaining a first speech feature signal according to the first speed-adjusted speech signal;
    obtaining a detection result according to a first keyword detection result corresponding to the first speech feature signal, the detection result indicating whether a target keyword exists in the to-be-detected speech signal; and
    performing an operation corresponding to the target keyword in response to determining that the target keyword exists according to the detection result.

2. The detection method according to claim 1, wherein the obtaining an enhanced speech signal of a to-be-detected speech signal comprises:
    obtaining the to-be-detected speech signal; and
    processing the to-be-detected speech signal through a speech enhancement algorithm, to obtain the enhanced speech signal.

3. The detection method according to claim 2, wherein the to-be-detected speech signal is a speech signal received through a single speech input device; and
    the processing the to-be-detected speech signal through a speech enhancement algorithm, to obtain the enhanced speech signal comprises:
    processing the to-be-detected speech signal through at least one of an echo cancellation algorithm, a noise cancellation algorithm, and a reverberation cancellation algorithm, to obtain the enhanced speech signal, the echo cancellation algorithm being used for canceling an echo signal in the to-be-detected speech signal, the noise cancellation algorithm being used for suppressing at least one of stationary noise or non-stationary noise in the to-be-detected speech signal, and the reverberation cancellation algorithm being used for canceling a reverberation in the to-be-detected speech signal.

4. The detection method according to claim 2, wherein the to-be-detected speech signal is a speech signal received through a plurality of speech input devices; and
    the processing the to-be-detected speech signal through a speech enhancement algorithm, to obtain the enhanced speech signal comprises:
    processing the to-be-detected speech signal through at least one of an echo cancellation algorithm or a reverberation cancellation algorithm, to obtain a first to-be-processed signal, the echo cancellation algorithm being used for canceling an echo signal in the to-be-detected speech signal, the reverberation cancellation algorithm being used for canceling a reverberation in the to-be-detected speech signal, and the first to-be-processed signal comprising a plurality of channels of signals;
    performing spatial filtering processing on the first to-be-processed signal through a beamforming algorithm to obtain a second to-be-processed signal, the second to-be-processed signal comprising one channel of signal; and suppressing stationary noise and non-stationary noise in the second to-be-processed signal through a noise cancellation algorithm, to obtain the enhanced speech signal.

5. The detection method according to claim 1, wherein the cache is a First In First Out (FIFO) cache.

6. The detection method according to claim 1, wherein the performing speed adjustment on the to-be-processed enhanced speech signal to obtain a target speed-adjusted speech signal comprises:
determining a first speech frame according to the to-be-processed enhanced speech signal, a first sample number, and an analysis frame stride;
calculating natural continuous speech frames according to the first speech frame, the first sample number, and a synthetic stride;
determining a second speech frame according to the to-be-processed enhanced speech signal and the analysis frame stride;
obtaining a second sample number according to the second speech frame and the natural continuous speech frames;
determining a to-be-matched speech frame according to the to-be-processed enhanced speech signal, the second sample number, and the analysis frame stride; and
determining the target speed-adjusted speech signal according to the first speech frame and the to-be-matched speech frame.

7. The detection method according to claim 6, wherein the obtaining a second sample number according to the second speech frame and the natural continuous speech frames comprises:
calculating a minimum cross average magnitude difference function (cross-AMDF) coefficient of two speech frames according to the natural continuous speech frames and the to-be-matched second speech frame; and
calculating the second sample number according to the minimum cross-AMDF coefficients of two speech frames and a maximum sample number that can be moved.

8. The detection method according to claim 1, wherein after obtaining the first keyword detection result corresponding to the first speech feature signal, the method further comprises:
determining, when the first keyword detection result is a first character, that the target keyword exists in the to-be-detected speech signal; and
determining, when the first keyword detection result is a second character, that the target keyword does not exist in the to-be-detected speech signal.

9. The detection method according to claim 1, wherein after obtaining the first keyword detection result corresponding to the first speech feature signal, the method further comprises:
determining a target probability value according to the keyword detection result;
determining, when the target probability value is greater than or equal to a keyword probability threshold, that the target keyword exists in the to-be-detected speech signal; and
determining, when the target probability value is less than the keyword probability threshold, that the target keyword does not exist in the to-be-detected speech signal.

10. The detection method according to claim 1, wherein after the obtaining an enhanced speech signal of a to-be-detected speech signal, the method further comprises:

obtaining a second speech feature signal according to the enhanced speech signal, the second speech feature signal having the target speech speed; and
obtaining a second keyword detection result corresponding to the second speech feature signal, the detection result being obtained according to at least one of the first keyword detection result and the second keyword detection result.

11. The detection method according to claim 10, wherein after the obtaining an enhanced speech signal of a to-be-detected speech signal, the method further comprises:
determining whether the current enhanced speech signal is in an echo signal canceling state;
obtaining, in response to that the current enhanced speech signal is in the echo signal canceling state, the second speech feature signal according to the enhanced speech signal, and obtaining the detection result according to the second keyword detection result corresponding to the second speech feature signal; and
obtaining, in response to that the current enhanced speech signal is not in the echo signal canceling state, the first speech feature signal according to the first speed-adjusted speech signal, and obtaining the second speech feature signal according to the enhanced speech signal, the detection result being obtained according to both the first keyword detection result and the second keyword detection result.

12. The detection method according to claim 1, wherein after the obtaining an enhanced speech signal of a to-be-detected speech signal, the method further comprises:
obtaining a second speech feature signal according to the enhanced speech signal, the second speech feature signal having the target speech speed; and
performing speed adjustment on the enhanced speech signal to obtain a second speed-adjusted speech signal having a third speech speed, the third speech speed being greater than the target speech speed, and the first speech speed being less than the target speech speed;
obtaining a third speech feature signal according to the second speed-adjusted speech signal; and
obtaining a third keyword detection result corresponding to the third speech feature signal, the detection result being obtained according to the first keyword detection result and the third keyword detection result.

13. A computer device, comprising: a memory, and a processor,
the memory being configured to store a program,
the processor being configured to execute the program in the memory, to perform a plurality of operations comprising:
obtaining an enhanced speech signal of a to-be-detected speech signal, the enhanced speech signal corresponding to a target speech speed;
performing speed adjustment on the enhanced speech signal to obtain a first speed-adjusted speech signal having a first speech speed, comprising:
writing the enhanced speech signal into a cache;
reading a to-be-processed enhanced speech signal from the cache when a storage threshold of the cache is reached, a duration of the to-be-processed enhanced speech signal being less than or equal to a duration of the enhanced speech signal; and
performing speed adjustment on the to-be-processed enhanced speech signal to obtain a target speed-adjusted speech signal having the first speech speed, the first speed-adjusted speech signal comprising the target speed-adjusted speech signal, a duration of the target speed-adjusted speech signal being less than or equal to a duration of the first speed-adjusted speech signal, and the first speech speed being different from the target speech speed;

obtaining a first speech feature signal according to the first speed-adjusted speech signal;

obtaining a detection result according to a first keyword detection result corresponding to the first speech feature signal, the detection result indicating whether a target keyword exists in the to-be-detected speech signal; and performing an operation corresponding to the target keyword in response to determining that the target keyword exists according to the detection result.

14. The device according to claim 13, wherein the obtaining an enhanced speech signal of a to-be-detected speech signal comprises:

obtaining the to-be-detected speech signal; and processing the to-be-detected speech signal through a speech enhancement algorithm, to obtain the enhanced speech signal.

15. The device according to claim 14, wherein the to-be-detected speech signal is a speech signal received through a single speech input device; and the processing the to-be-detected speech signal through a speech enhancement algorithm, to obtain the enhanced speech signal comprises:

processing the to-be-detected speech signal through at least one of an echo cancellation algorithm, a noise cancellation algorithm, and a reverberation cancellation algorithm, to obtain the enhanced speech signal, the echo cancellation algorithm being used for canceling an echo signal in the to-be-detected speech signal, the noise cancellation algorithm being used for suppressing at least one of stationary noise or non-stationary noise in the to-be-detected speech signal, and the reverberation cancellation algorithm being used for canceling a reverberation in the to-be-detected speech signal.

16. The device according to claim 14, wherein the to-be-detected speech signal is a speech signal received through a plurality of speech input devices; and the processing the to-be-detected speech signal through a speech enhancement algorithm, to obtain the enhanced speech signal comprises:

processing the to-be-detected speech signal through at least one of an echo cancellation algorithm or a reverberation cancellation algorithm, to obtain a first to-be-processed signal, the echo cancellation algorithm being used for canceling an echo signal in the to-be-detected speech signal, the reverberation cancellation algorithm being used for canceling a reverberation in the to-be-detected speech signal, and the first to-be-processed signal comprising a plurality of channels of signals;

performing spatial filtering processing on the first to-be-processed signal through a beamforming algorithm to obtain a second to-be-processed signal, the second to-be-processed signal comprising one channel of signal; and suppressing stationary noise and non-stationary noise in the second to-be-processed signal through a noise cancellation algorithm, to obtain the enhanced speech signal.

17. The device according to claim 13, wherein the cache is a First In First Out (FIFO) cache.

18. The device according to claim 13, wherein the performing speed adjustment on the to-be-processed enhanced speech signal to obtain a target speed-adjusted speech signal comprises:

determining a first speech frame according to the to-be-processed enhanced speech signal, a first sample number, and an analysis frame stride;

calculating natural continuous speech frames according to the first speech frame, the first sample number, and a synthetic stride;

determining a second speech frame according to the to-be-processed enhanced speech signal and the analysis frame stride;

obtaining a second sample number according to the second speech frame and the natural continuous speech frames;

determining a to-be-matched speech frame according to the to-be-processed enhanced speech signal, the second sample number, and the analysis frame stride; and determining the target speed-adjusted speech signal according to the first speech frame and the to-be-matched speech frame.

19. The device according to claim 13, wherein after the obtaining an enhanced speech signal of a to-be-detected speech signal, the method further comprises:

obtaining a second speech feature signal according to the enhanced speech signal, the second speech feature signal having the target speech speed; and obtaining a second keyword detection result corresponding to the second speech feature signal, the detection result being obtained according to at least one of the first keyword detection result and the second keyword detection result.

20. A non-transitory computer-readable storage medium comprising computer instructions, when being run on a computer, the computer instructions cause the computer to perform a plurality of operations comprising:

obtaining an enhanced speech signal of a to-be-detected speech signal, the enhanced speech signal corresponding to a target speech speed;

performing speed adjustment on the enhanced speech signal to obtain a first speed-adjusted speech signal having a first speech speed, comprising:

writing the enhanced speech signal into a cache;

reading a to-be-processed enhanced speech signal from the cache when a storage threshold of the cache is reached, a duration of the to-be-processed enhanced speech signal being less than or equal to a duration of the enhanced speech signal; and performing speed adjustment on the to-be-processed enhanced speech signal to obtain a target speed-adjusted speech signal having the first speech speed, the first speed-adjusted speech signal comprising the target speed-adjusted speech signal, a duration of the target speed-adjusted speech signal being less than or equal to a duration of the first speed-adjusted speech signal, and the first speech speed being different from the target speech speed;

obtaining a first speech feature signal according to the first speed-adjusted speech signal;

obtaining a detection result according to a first keyword detection result corresponding to the first speech feature signal, the detection result indicating whether a target keyword exists in the to-be-detected speech signal; and performing an operation corresponding to the target keyword in response to determining that the target keyword exists according to the detection result.

\* \* \* \* \*